(12) United States Patent
Okuzumi et al.

(10) Patent No.: US 10,318,078 B2
(45) Date of Patent: Jun. 11, 2019

(54) OPERATION KNOB AND DISPLAY DEVICE IN WHICH SAME IS USED

(71) Applicant: Panasonic Intellectual Property Management Co., Ltd., Osaka (JP)

(72) Inventors: Tomoya Okuzumi, Tokyo (JP); Tomohito Kawada, Kanagawa (JP); Tomoaki Yamamoto, Kanagawa (JP); Sohtaro Okano, Kanagawa (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 255 days.

(21) Appl. No.: 15/306,821

(22) PCT Filed: May 14, 2015

(86) PCT No.: PCT/JP2015/002444
§ 371 (c)(1),
(2) Date: Oct. 26, 2016

(87) PCT Pub. No.: WO2015/174092
PCT Pub. Date: Nov. 19, 2015

(65) Prior Publication Data
US 2017/0052617 A1   Feb. 23, 2017

(30) Foreign Application Priority Data

May 15, 2014  (JP) .................. 2014-101650
Jun. 3, 2014   (JP) .................. 2014-114777
(Continued)

(51) Int. Cl.
*G05G 1/02*    (2006.01)
*G05G 1/10*    (2006.01)
(Continued)

(52) U.S. Cl.
CPC .............. *G06F 3/044* (2013.01); *B60R 16/02* (2013.01); *G05G 1/02* (2013.01); *G05G 1/10* (2013.01);
(Continued)

(58) Field of Classification Search
CPC combination set(s) only.
See application file for complete search history.

(56) References Cited

U.S. PATENT DOCUMENTS 5,936,613 A * 8/1999 Jaeger .................. G06F 3/0238
345/172
6,326,956 B1 * 12/2001 Jaeger .................. G06F 3/0317
178/19.05
(Continued)

FOREIGN PATENT DOCUMENTS

JP   2004-192634    7/2004
JP   2006-504948    2/2006
(Continued)

OTHER PUBLICATIONS

Communication pursuant to Rule 164(1) dated Apr. 5, 2017 for the related European Patent Application No. 15793151.0.
(Continued)

*Primary Examiner* — Priyank J Shah
(74) *Attorney, Agent, or Firm* — McDermott Will & Emery LLP

(57) ABSTRACT

An operation knob attachable onto a touch functional display panel includes an operation unit and a transmitting unit. The transmitting unit transmits, to the touch functional display panel, an operation performed to the operation unit at a position distant from a surface of the touch functional display panel.

7 Claims, 22 Drawing Sheets

(30) Foreign Application Priority Data

Jun. 3, 2014 (JP) ................................ 2014-114778
Jun. 3, 2014 (JP) ................................ 2014-114779

(51) Int. Cl.
*G06F 3/02* (2006.01)
*B60R 16/02* (2006.01)
*H01H 25/00* (2006.01)
*G06F 3/0362* (2013.01)
*G06F 3/044* (2006.01)
*G06F 3/0354* (2013.01)

(52) U.S. Cl.
CPC ............ *G05G 1/105* (2013.01); *G06F 3/02* (2013.01); *G06F 3/0362* (2013.01); *G06F 3/03547* (2013.01); *H01H 25/00* (2013.01); *H01H 2219/062* (2013.01)

(56) References Cited

U.S. PATENT DOCUMENTS

| | | | | |
|---|---|---|---|---|
| 8,502,092 | B2* | 8/2013 | Chou | H01H 25/065 200/14 |
| 9,513,744 | B2* | 12/2016 | Pryor | G01C 21/3664 |
| 2004/0021702 | A1* | 2/2004 | Lucaci | G06F 1/1626 715/864 |
| 2004/0104826 | A1 | 6/2004 | Philipp | |
| 2004/0155863 | A1 | 8/2004 | Sakamaki et al. | |
| 2005/0064936 | A1* | 3/2005 | Pryor | A63F 3/00643 463/36 |
| 2006/0007179 | A1* | 1/2006 | Pihlaja | G06F 3/04886 345/173 |
| 2006/0256090 | A1* | 11/2006 | Huppi | A63F 13/02 345/173 |
| 2007/0181410 | A1* | 8/2007 | Baier | F24C 7/082 200/17 R |
| 2008/0129707 | A1* | 6/2008 | Pryor | G06F 3/0312 345/175 |
| 2009/0260963 | A1* | 10/2009 | Eto | G05G 1/02 200/293 |
| 2010/0214257 | A1* | 8/2010 | Wussler | G06F 3/0362 345/174 |
| 2013/0175147 | A1* | 7/2013 | Hisada | H01H 19/14 200/11 R |
| 2014/0021024 | A1* | 1/2014 | Heimann | G05G 5/065 200/4 |
| 2014/0042004 | A1* | 2/2014 | Tseng | G06F 3/0488 200/336 |
| 2016/0064167 | A1* | 3/2016 | Lyszus | H03K 17/9622 200/336 |

FOREIGN PATENT DOCUMENTS

| | | |
|---|---|---|
| JP | 2007-109649 | 4/2007 |
| JP | 2012-035782 | 2/2012 |
| WO | 2012/048852 A1 | 4/2012 |
| WO | 2012/111075 | 8/2012 |
| WO | 2012/139203 A1 | 10/2012 |

OTHER PUBLICATIONS

International Search Report of PCT application No. PCT/JP2015/002444 dated Jul. 7, 2015.
The Extended European Search Report dated Jul. 3, 2017 for the related European Patent Application No. 15793151.0.

* cited by examiner

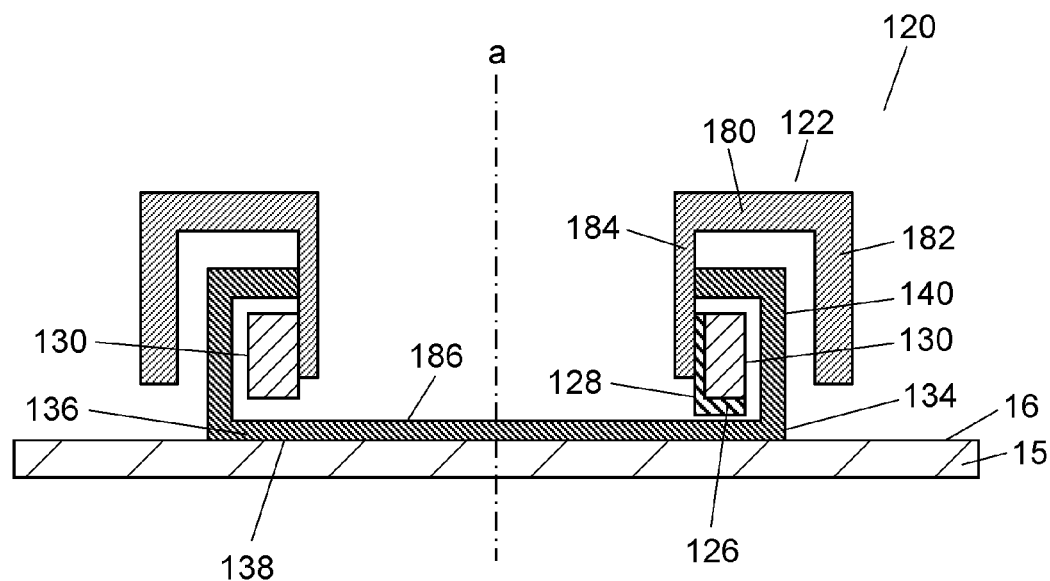
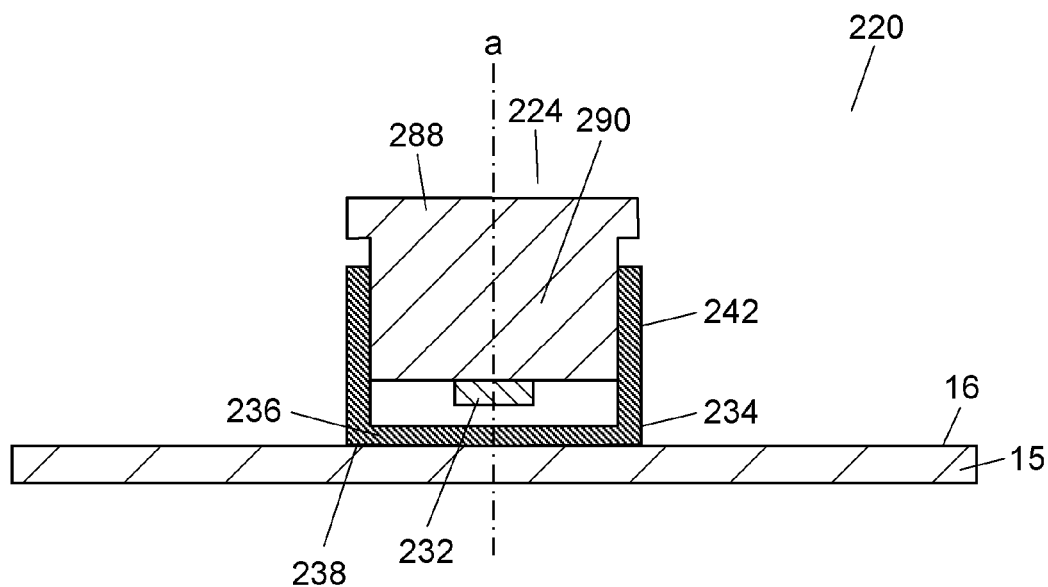

OPERATION KNOB AND DISPLAY DEVICE IN WHICH SAME IS USED

This application is a U.S. national stage application of the PCT international application No. PCT/JP2015/002444 filed on May 14, 2015, which claims the benefit of foreign priority of Japanese patent application No. 2014-101650 filed on May 15, 2014, Japanese patent application No. 2014-114777 filed on Jun. 3, 2014, Japanese patent application No. 2014-114778 filed on Jun. 3, 2014, and Japanese patent application No. 2014-114779 filed on Jun. 3, 2014, the contents all of which are incorporated herein by reference.

TECHNICAL FIELD

The present invention relates to an operation knob and particularly to an operation knob operated by an operator and a display device including the knob.

BACKGROUND ART

Upon operating on-board devices, such as a car audio device and a car navigation device, a user may use a touch button displayed on a touch panel as an operation switch. However, operability is degraded when a touch button is used with respect to a specific adjusting operation, such as volume level adjustment. Thus, a rotary operator disposed on a touch panel is disclosed (for example, PTL 1).

CITATION LIST

Patent Literature

PTL 1: Japanese Patent Laid-Open Publication No. 2012-35782

SUMMARY

The present invention provides an operation knob having improved operability and durability and a display device including the knob.

An operation knob according to an aspect of the invention is an operation knob that is attachable onto a touch functional display panel and includes an operation unit and a transmitting unit which transmits, to the touch functional display panel, an operation performed by an operator to the operation unit at a position distant from the surface of the touch functional display panel.

Another aspect of the present invention is a display device. The display device includes the touch functional display panel and the operation knob attached onto the touch functional display panel.

Operability and durability of the operation knob according to the present invention can be improved.

BRIEF DESCRIPTION OF DRAWINGS

FIG. 9 is a sectional view of another operation knob according to the first exemplary embodiment of the present invention.

FIG. 10 is a sectional view of still another operation knob according to the first exemplary embodiment of the present invention.

DETAIL DESCRIPTION OF PREFERRED EMBODIMENTS

Problems of a display device including the conventional operation knob will be briefly described before description of exemplary embodiments of the present invention. A tip end of a terminal of a rotary operator disclosed in PTL 1 contacts a touch panel and is moved on the touch panel by a rotating operation of an operation member. Thus, when an operation that moves the terminal contacting the touch panel is repeated, the touch panel may be damaged. At this moment, the terminal is worn, and the terminal may not preferably contact the touch panel.

First Exemplary Embodiment

A first exemplary embodiment of the present invention relates to a display device including an operation knob attached onto a touch functional display panel. An example of the display device is an on-board device, such as a car audio device and a car navigation device. It is effective to attach the operating knob onto the touch functional display panel in order to improve operability of the touch functional display panel.

However, when a rotating operation to the operation knob as shown in PTL 1 is repeated, a part of the operation knob continues to rotate while contacting the touch functional display panel. This rotation may damage the touch functional display panel. Accordingly, the exterior of the touch functional display panel is damaged, and the durability of the touch functional display panel is degraded. In addition, a part of the operation knob contacting the touch functional display panel is worn, and the operation knob may not preferably contact the touch functional display panel. Furthermore, when dust enters between the operation knob and the touch functional display panel, the operation knob cannot preferably contact the touch functional display panel. The durability of the operation knob is degraded. Such a situation also occurs in the case where the operation knob is pushed to be operated. Not only the operability of the display device but also the durability thereof are required to improve.

Display device 100 according to the exemplary embodiment will be described below with reference to the drawings.

Figure 1:
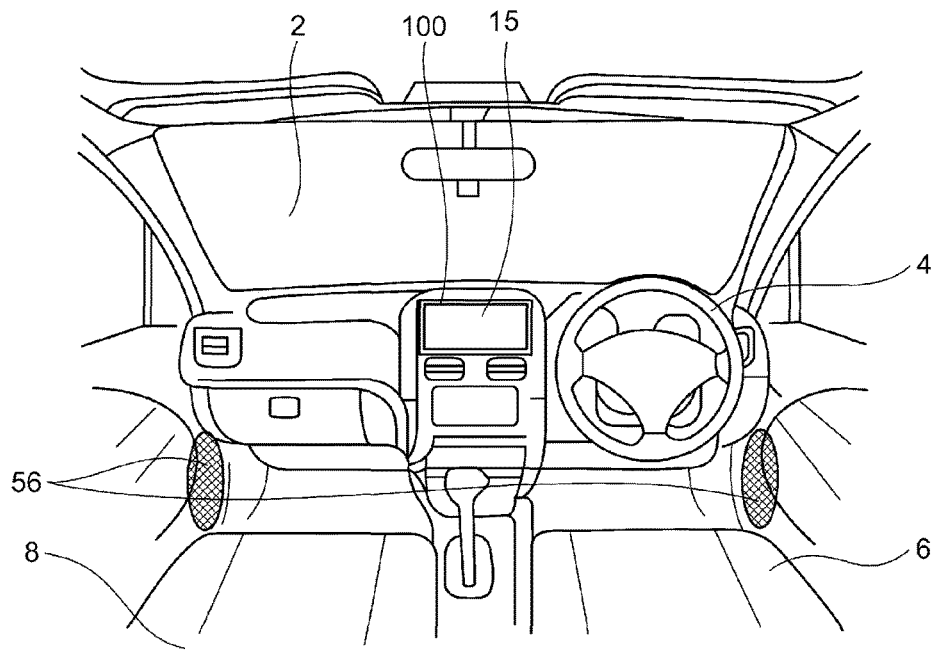
FIG. 1 is an exterior view of an inside of a cabin viewing from a rear of the cabin in which a display device according to a first exemplary embodiment of the present invention is mounted.

FIG. 1 is an exterior view of an inside of a cabin viewing from a rear of the cabin in which display device 100 is mounted. Driver seat 6 is disposed on the right side in a front of the inside of the cabin while passenger seat 8 on the left side in the front of the inside of the cabin. Steering wheel 4 is disposed in front of driver seat 6. Steering wheel 4 and driver seat 6 may be disposed on the left side. Windshield 2 is disposed in front of steering wheel 4.

Display device 100 is installed at, e.g. a side of steering wheel 4 in a center console on the left of steering wheel 4. Display device 100 includes touch functional display panel 15 (hereinafter, panel). Panel 15 faces the cabin. Display device 100 is configured as an on-board device as described above. Display device 100 may have a function of a temperature adjusting interface of an air conditioner in addition to a function of a car audio device or a car navigation device. Display device 100 is connected to loudspeaker 56 via a cable not illustrated. Loudspeaker 56 is disposed, e.g. an inside of each of left and right doors.

Figure 2:
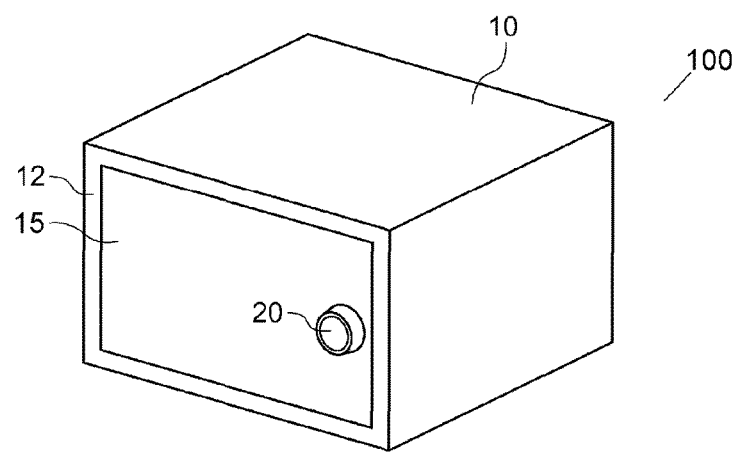
FIG. 2 is a perspective view of the display device illustrated in FIG. 1.

FIG. 2 is a perspective view of display device 100 for illustrating an exterior thereof. Display device 100 further includes case 10 and operation knob 20. Case 10 includes body frame 12. Panel 15 is surrounded by body frame 12. Case 10 has substantially a rectangular parallelepipedal shape.

Body frame 12 is disposed on the front side of case 10. Body frame 12 has a frame shape and supports a periphery of panel 15 on the front side. Panel 15 is a display panel that includes a touch operable display, that is, a touch panel. The touch panel of in panel 15 is, for example, of a capacitive type. The touch panel may be a surface type or may be a projected type. The surface type touch panel includes three layers of a cover, a conductive film, and a glass substrate. The conductive film is bonded onto the glass substrate. Electrodes are disposed at four corners of the glass substrate. Meanwhile, the projected type touch panel includes an insulating film and an electrode layer under the insulating film. A cover lens may be disposed on a front surface of the insulating film. When a finger approaches the surface of panel 15, a capacitance thereof changes. A sensor senses this change, thereby detecting the position approached with the finger.

Figure 3:
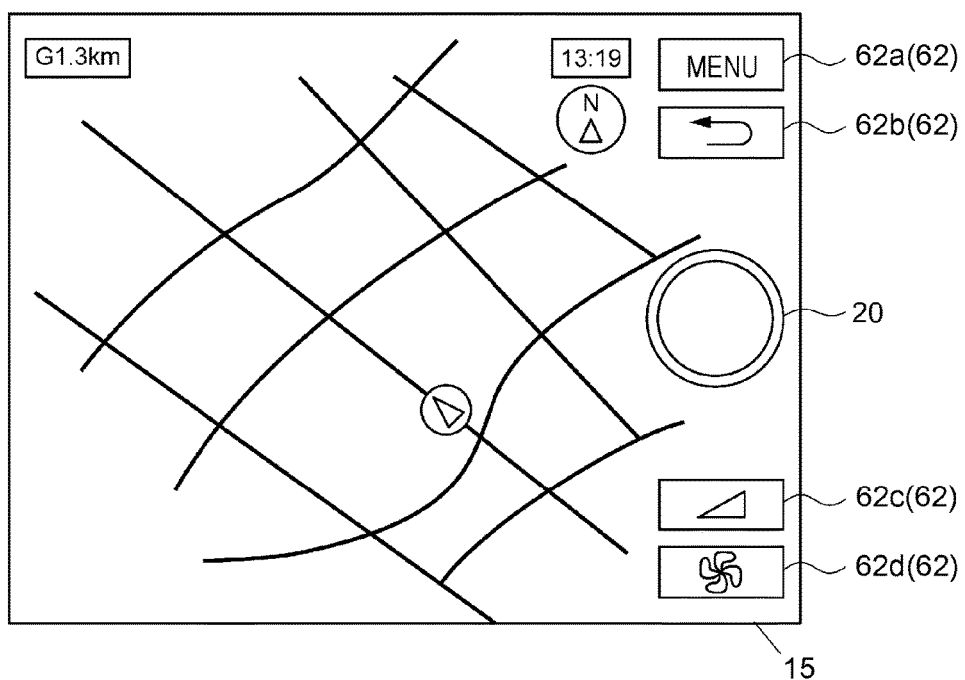
FIG. 3 illustrates a navigation screen displayed on a touch functional display panel illustrated in FIG. 2.

FIG. 3 illustrates a navigation screen displayed on panel 15. Panel 15 displays a road map, and further displays touch buttons 62 including first touch button 62a, second touch button 62b, third touch button 62c, and fourth touch button 62d. Touch buttons 62 are buttons for operating display device 100 by touch operations. The touch buttons may be referred to as soft keys. First touch button 62a is a button for displaying a "MENU". Second touch button 62b is a button for returning to the original screen. Third touch button 62c is a button for displaying a temperature adjusting interface. Fourth touch button 62d is a button for displaying a volume level adjusting interface. Operation knob 20 is disposed on the right side of panel 15.

As illustrated in FIG. 2, operation knob 20 is attached to the right side of the panel, that is, a position near driver seat 6 illustrated in FIG. 1. Operation knob 20 may be attached onto another position, for example, the lower part of panel 15. Operation knob 20 is operated by an operator, such as a driver or a passenger to operate display device 100. That is, the operator not only operates display device 100 by contacting a touch button but also can operate display device 100 by, for example, rotating operation knob 20. An operation that can be performed to operation knob 20 and an operation that can be performed to a touch button may be the same or may be different.

Figure 4:
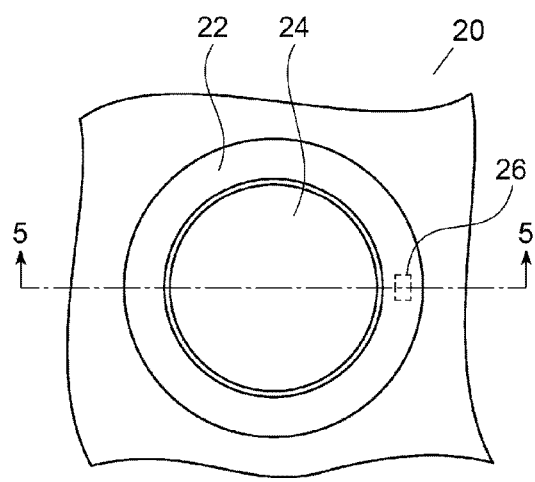
FIG. 4 is a front view of an operation knob illustrated in FIG. 2.

FIG. 4 is a front view of operation knob 20. Button type operation unit 24 has a circular shape in a plan view, and is disposed at the center of operation knob 20. Button type operation unit 24 is a push button and is pushed to be operated by the operator. Dial type operation unit 22 has a circular annular shape in a plan view, and is disposed around button type operation unit 24. Dial type operation unit 22 is a rotary dial and can rotate clockwise and counterclockwise. Dial type operation unit 22 is rotated by the operator to be operated.

Figure 5:
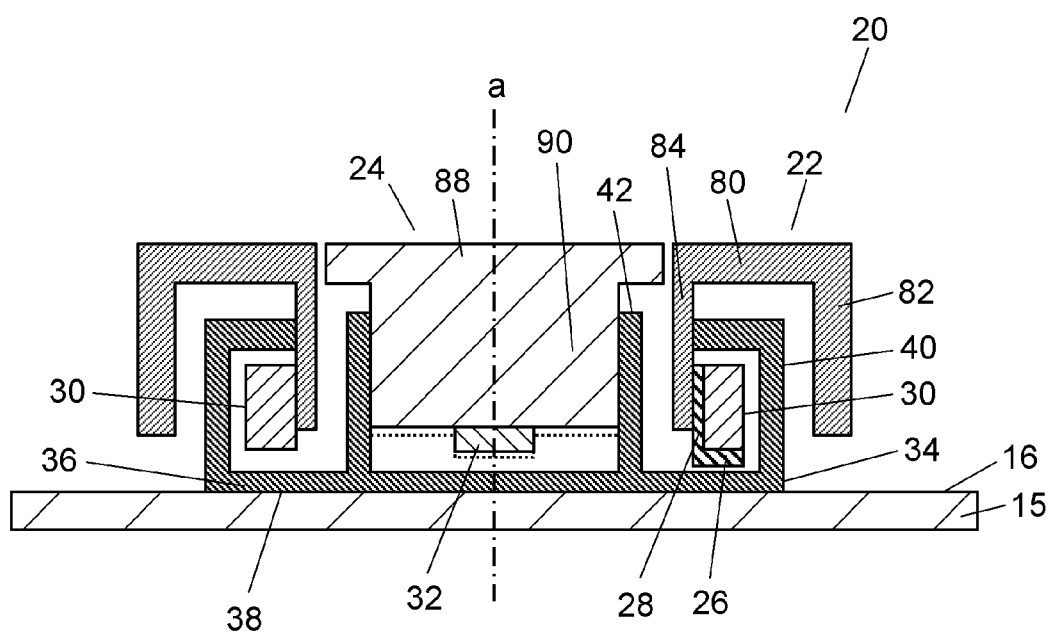
FIG. 5 is a sectional view of the operation knob illustrated in FIG. 2.

FIG. 5 is a sectional view of operation knob 20 and illustrates a section of the knob along line 5-5 illustrated in FIG. 4. In description below, upward and downward directions and leftward and rightward directions will be based on the positional relationship illustrated in FIG. 5. Surface 16 is disposed in the uppermost portion of panel 15. Surface 16 is a surface a glass substrate in a case where panel 15 includes a surface type touch panel, or is a surface of a cover lens in a case where panel 15 includes a projected type touch panel. Operation knob 20 includes dial type operation unit 22, button type operation unit 24, rotation transmitting unit 26, connecting unit 28, rotating unit 30, push transmitting unit 32, and housing 34. Dial type operation unit 22 includes upper portion 80, outer wall portion 82, and inner wall portion 84 while button type operation unit 24 includes upper portion 88 and protruding portion 90. Housing 34 includes base portion 36, outer supporting unit 40, and inner supporting unit 42. Housing 34 supports dial type operation unit 22, button type operation unit 24, rotation transmitting unit 26, and push transmitting unit 32. Housing 34 is attached to panel 15. Housing 34 is made of non-conductive material, such as plastic.

Base portion 36 has a circular plate shape. The radius of base portion 36 is greater than the distance from axis a to the outside of rotation transmitting unit 26 (greater than the outside diameter of rotation transmitting unit 26), and is smaller than the inside diameter of annular outer wall portion 82. The lower surface of base portion 36 constitutes attachment surface 38 for attaching operation knob 20 to panel 15. Attachment surface 38 may be bonded to panel 15 with an adhesive or a double-sided tape.

Outer supporting unit 40 includes a tubular portion having an annular shape standing on the outer edge of base portion 36, and a plate ring portion extending inwards from the upper portion of the tubular portion. Outer supporting unit 40 supports inner wall portion 84 of dial type operation unit 22 described later rotatably at the inner edge of the plate ring portion. Thus, dial type operation unit 22 can rotate about axis a.

Inner supporting unit 42 has an annular shape standing on the inner side from outer supporting unit 40 in base portion 36. Inner supporting unit 42 supports protruding portion 90 of button type operation unit 24 on the inner surface of inner supporting unit 42 while allowing protruding portion 90 to move in the upward and downward directions. This configuration allows button type operation unit 24 to be pushed down.

Upper portion 80 has a plate ring shape and constitutes the upper surface side operation part of dial type operation unit 22. Outer wall portion 82 extends downward from the outer edge of upper portion 80 while inner wall portion 84 extends downward from the inner edge of upper portion 80. As described above, a part of the outer surface of inner wall portion 84 is rotatably supported by outer supporting unit 40 of housing 34. Outer wall portion 82 constitutes the side surface side operation part of dial type operation unit 22. When the operator operates dial type operation unit 22 in such a configuration, dial type operation unit 22 rotates about axis a substantially perpendicular to surface 16 of panel 15. The term "substantially" means that the perpendicularity is different by a slight error.

Rotation transmitting unit 26 has a rectangular shape in a case where operation knob 20 is seen through from the front as illustrated in FIG. 4. Rotation transmitting unit 26 is designed to have a size to be sensed by a sensor of panel 15. Rotation transmitting unit 26 is distant from surface 16 of panel 15 in the upward and downward directions. Rotation transmitting unit 26 faces panel 15 across base portion 36 of housing 34. Connecting unit 28 is disposed in the inner edge of rotation transmitting unit 26, and is connected to the lower part of the outer surface of inner wall portion 84 (inner wall portion 84 on the right side of FIG. 5). Rotation transmitting unit 26 and connecting unit 28 may be integrated or may be formed individually. Since dial type operation unit 22 and rotation transmitting unit 26 are connected with connecting unit 28, rotation transmitting unit 26 rotates about axis a in conjunction with rotation of dial type operation unit 22.

Dial type operation unit 22, connecting unit 28, and rotation transmitting unit 26 are made of conductive material, such as metal or conductive resin. Dial type operation unit 22 and rotation transmitting unit 26 may be made of the same material or may be made of different material. Since dial type operation unit 22 and rotation transmitting unit 26 are made of conductive material, and are electrically connected to each other. Thus, when the operator contacts dial type operation unit 22, electric charges concentrate to rotation transmitting unit 26 similarly to a tip end of a fingertip. Thus, the sensor of panel 15 detects the position of rotation transmitting unit 26. Furthermore, since rotation transmitting unit 26 rotates in conjunction with a rotating operation performed to dial type operation unit 22, the sensor of panel 15 detects the position corresponding to the rotating operation. Rotation transmitting unit 26 thus transmits, to panel 15, an operation performed by the operator to dial type operation unit 22 at a position distant from surface 16 of panel 15. That is, rotation transmitting unit 26 transmits, to panel 15, an operation performed by the operator to dial type operation unit 22 at a position distant from attachment surface 38 of housing 34.

Rotating unit 30 has a ring shape and is connected to the lower part of the outer surface of inner wall portion 84. Rotating unit 30 is made of non-conductive material.

Upper portion 88 has a circular plate shape, and is surrounded by upper portion 80 of circular annular dial type operation unit 22. Protruding portion 90 protrudes downward from the center of the lower surface of upper portion 88. Protruding portion 90 has a cylindrical columnar shape having a diameter smaller than the diameter of upper portion 88. As described above, protruding portion 90 is supported movably in the upward and downward directions by the inner surface of inner supporting unit 42 of housing 34. Upper portion 88 and protruding portion 90 may be integrated or may be formed individually. When the operator pushes upper portion 88 in such a configuration, button type operation unit 24 is pushed in a direction substantially perpendicular to surface 16 of panel 15.

Push transmitting unit 32 is disposed at the center of the lower surface of protruding portion 90. Push transmitting unit 32 approaches surface 16 of panel 15 in conjunction with pushing of button type operation unit 24. However, push transmitting unit 32 maintains to be distant from surface 16 of panel 15 in the upward and downward directions even if button type operation unit 24 is pushed. Push transmitting unit 32 faces panel 15 across housing 34 similarly to rotation transmitting unit 26. Push transmitting unit 32 thus transmits, to panel 15, an operation performed by the operator to button type operation unit 24 at a position distant from surface 16 of panel 15. That is, push transmitting unit 32 transmits, to panel 15, an operation performed by the operator to button type operation unit 24 at a position distant from attachment surface 38 of housing 34.

Push transmitting unit 32 may be referred to as a further transmitting unit in a case where push transmitting unit 32 is considered to be disposed in addition to rotation transmitting unit 26 of dial type operation unit 22. Button type operation unit 24 that can be pushed in a direction substantially perpendicular to surface 16 of panel 15 is a button arranged with dial type operation unit 22. Push transmitting unit 32, the further transmitting unit, transmits, to panel 15, a push operation performed to button type operation unit 24 when approaching surface 16 of panel 15 in conjunction with pushing of button type operation unit 24.

Upon the operator moving the finger away from upper portion 88, button type operation unit 24 rises to return from the pushed state to the original state. Therefore, an elastic body, such as a rubber, not illustrated may be disposed.

Button type operation unit 24 and push transmitting unit 32 are made of conductive material and are electrically connected to each other similarly to dial type operation unit 22 and rotation transmitting unit 26. Button type operation unit 24 and push transmitting unit 32 may be made of the same material or may be made of different material. When the operator pushes and contacts button type operation unit 24 to operate button type operation unit 24, push transmitting unit 32 is accordingly pushed in conjunction with the pushing of the button type operation unit. Electric charges concentrate to the pushed position in push transmitting unit 32 similarly to a tip of a finger. Push transmitting unit 32 thus transmits, to panel 15, a push operation performed by the operator to button type operation unit 24.

A dotted line in FIG. 5 denotes the positions of push transmitting unit 32 and the lower surface of protruding portion 90 when button type operation unit 24 is pushed. The interval between push transmitting unit 32 and surface 16 in the case where button type operation unit 24 is pushed is substantially equal to the interval between rotation transmitting unit 26 of dial type operation unit 22 and surface 16, in contrary to the state with before button type operation 24 is pushed. Being expressed with the distance between push transmitting unit 32 and rotation transmitting unit 26, the distance between push transmitting unit 32 and rotation transmitting unit 26 after the pushing of the button type operation is shorter than the distance between push transmitting unit 32 and rotation transmitting unit 26 before the pushing of the button type operation.

Figure 6:
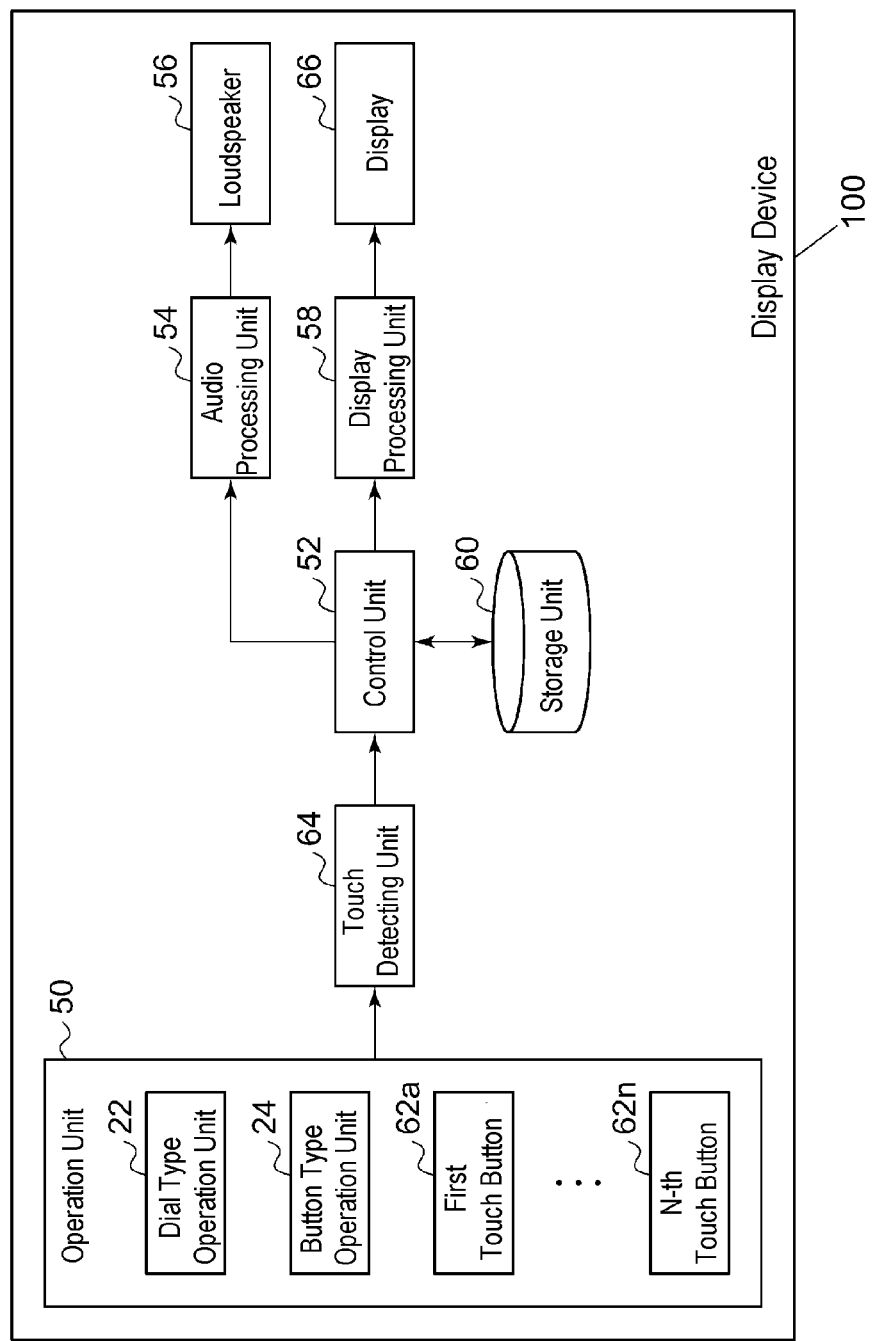
FIG. 6 is a block diagram of the display device illustrated in FIG. 2.

FIG. 6 is a block diagram of display device 100. Display device 100 includes operation unit 50, touch detecting unit 64, control unit 52, audio processing unit 54, loudspeaker 56, display processing unit 58, display unit 66, and storage unit 60. Operation unit 50 includes dial type operation unit 22, button type operation unit 24, and touch buttons 62 including first touch button 62a and N-th touch button 62n (N is an integer greater than or equal to two).

Dial type operation unit 22 and button type operation unit 24 has the configurations illustrated in FIG. 4 and FIG. 5, and are rotated and pushed to be operated by the operator, respectively. A rotating operation is transmitted by rotation transmitting unit 26 and is detected by touch detecting unit 64 that is the sensor of panel 15. A push operation is transmitted by push transmitting unit 32 and is detected by touch detecting unit 64. Touch button 62 is a soft key displayed on display unit 66 of panel 15. A touch operation performed by the operator to the soft key is detected by touch detecting unit 64. Touch detecting unit 64 outputs, to control unit 52, a detection signal in response to the detected rotating operation, push operation, and touch operation.

Control unit 52 performs, e.g. a car audio function, a car navigation function, and a function of the temperature adjusting interface in display device 100. These functions may use known technologies and thus will not be described here. Control unit 52 receives detection signals for the functions from touch detecting unit 64. Control unit 52 instructs audio processing unit 54 to output sounds in the functions and instructs display processing unit 58 to output images in the functions. Audio processing unit 54 generates sounds in response to the instruction from control unit 52 and allows the generated audio to be output from loudspeaker 56. Display processing unit 58 generates images in response to the instruction from control unit 52 and causes the generated images to be displayed on display unit 66 of panel 15. Display device 100 may not necessarily include loudspeaker 56.

Figure 7:
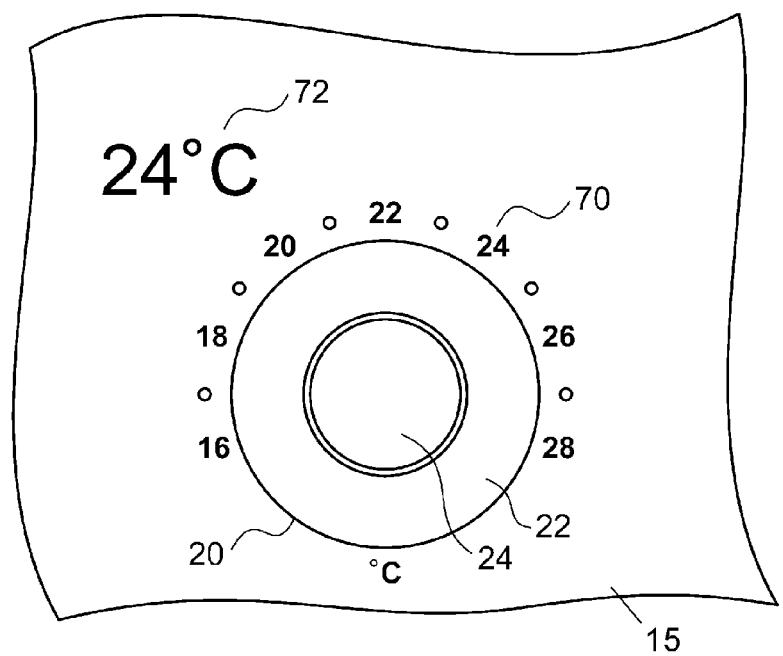
FIG. 7 illustrates an example of a screen displayed on the touch functional display panel illustrated in FIG. 2.

FIG. 7 illustrates a screen displayed on panel 15. This screen is a screen in a case that the function of the temperature adjusting interface performed in control unit 52. Temperature scale 70, such as 16, 18, . . . , 26, 28 (° C.) is displayed around dial type operation unit 22. This indicates a temperature to be set by the air conditioner. Temperature-setting indicator 72 indicates a temperature which is set. As described above, the operator rotating dial type operation unit 22 causes rotation transmitting unit 26, not illustrated, to move along temperature scale 70 displayed on panel 15. Thus, rotation transmitting unit 26 moves along a path having an arcuate shape.

The path having the arcuate shape is split into plural sections. These sections correspond to different temperatures. For example, a section near the display region of "24" (° C.) within temperature scale 70 corresponds to 24° C. Each temperature displayed in temperature scale 70 corresponds to respective one of the sections close to the temperature. This correspondence is stored in storage unit 60.

When the operator rotates dial type operation unit 22 to operate dial type operation unit 22 to position rotation transmitting unit 26, not illustrated, at the section corresponding to 24° C., touch detecting unit 64 detects rotation transmitting unit 26 positioned at the section and outputs a detection signal to control unit 52. In response to the detection signal, control unit 52 identifies the section at which rotation transmitting unit 26 is positioned. Furthermore, control unit 52 obtains the temperature corresponding to the identified section (24° C.) by referencing the correspondence stored in storage unit 60. The obtained temperature is output to the air conditioner and is displayed on temperature-setting indicator 72 by display processing unit 58.

A push operation performed to button type operation unit 24 corresponds to turning on and off of the air conditioner. The turning on and off is switched every time the push operation is performed. Storage unit 60 stores a position at which push transmitting unit 32 is to be detected on panel 15 (hereinafter, referred to as a "control position"), and the current setting of the turning on and off. When the operator pushes button type operation unit 24 to operate button type operation unit 24, touch detecting unit 64 detects the position of push transmitting unit 32 and outputs a detection signal to control unit 52. Control unit 52 identifies the position of push transmitting unit 32 based on the detection signal. Furthermore, control unit 52 checks a correspondence between the identified position and the control position stored in storage unit 60. In the case where the identified position corresponds to the control position stored in storage unit 60, control unit 52 checks the current setting of turning on and off stored in storage unit 60, and outputs, to the air conditioner, a setting opposite to the current setting, and updates the current setting of turning on and off stored in storage unit 60.

Figure 8:
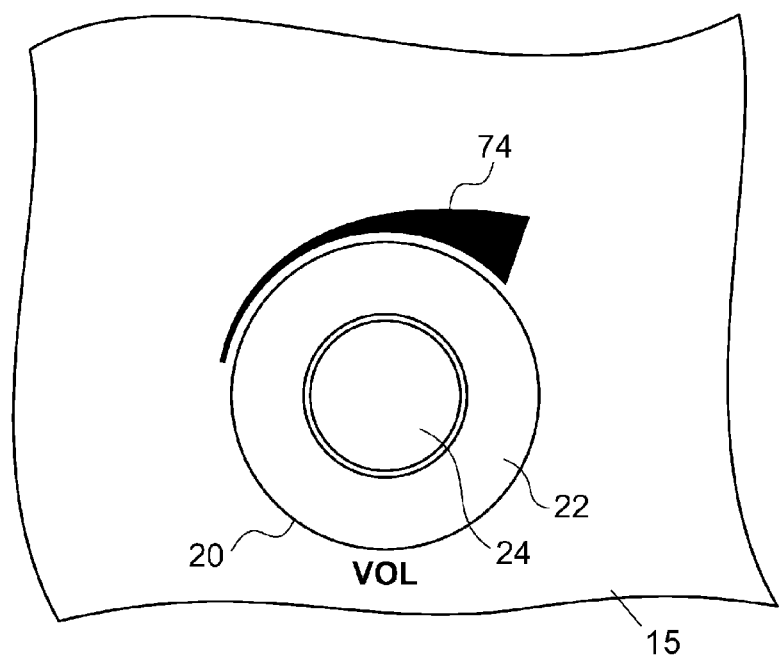
FIG. 8 illustrates another example of the screen displayed on the touch functional display panel illustrated in FIG. 2.

FIG. 8 illustrates another screen displayed on panel 15. This screen is displayed in the case that the car audio function or the car navigation function is performed in control unit 52. Volume level display 74 is displayed around dial type operation unit 22. Volume level display 74 indicates a volume level of sounds output from loudspeaker 56. The volume level is previously determined to increase as dial type operation unit 22 is rotated clockwise in FIG. 8. In FIG. 8, a path having an arcuate shape along which rotation transmitting unit 26 can move is divided into plural sections, as similarly to FIG. 7. Each of the sections corresponds to respective one of different volume levels. Each of volume levels thus corresponds to respective one of sections which is close to the level. Storage unit 60 stores this correspondence.

When the operator rotates dial type operation unit 22 to operate dial type operation unit 22 to position rotation transmitting unit 26 at a section corresponding to a predetermined volume level, control unit 52 obtains the volume level corresponding to the identified section, similarly to FIG. 7. The obtained volume level is output to audio processing unit 54. A push operation performed to button type operation unit 24 corresponds to a state of turning on and off of loudspeaker 56. The state of turning on and off is switched every time the push operation is performed. This is processed similarly to the case of FIG. 7 and thus will not be described.

This configuration can be implemented by a CPU and a memory of any computer or, in addition, by an LSI as hardware, and may be implemented by, e.g. a program loaded in the memory as software. FIG. 6 illustrates functional blocks that are implemented by cooperation of the hardware and the software. Therefore, these functional blocks can be implemented in various forms by only hardware or by combination of hardware and software.

According to the present embodiment, operation knob 20 can be attached onto panel 15. Operation knob 20 transmits, to panel 15, an operation at a position distant from the surface of panel 15. Thus, operability and durability can be improved. In addition, this configuration can prevent panel 15 from being damaged. In addition, this configuration can prevent wearing of rotation transmitting unit 26 and push transmitting unit 32. In addition, this configuration can prevent dust from being produced or disposed between panel 15 and one of rotation transmitting unit 26 and push transmitting unit 32.

Dial type operation unit 22 is electrically connected to rotation transmitting unit 26 while button type operation unit 24 is electrically connected to push transmitting unit 32. Thus, panel 15 including an electrostatic capacitive type touch panel can detect the positions of rotation transmitting unit 26 and push transmitting unit 32 in the case where dial type operation unit 22 and button type operation unit 24 is grasped with fingers.

In addition, since rotation transmitting unit 26 or push transmitting unit 32 faces panel 15 across housing 34, rotation transmitting unit 26 or push transmitting unit 32 can be prevented from contacting panel 15. For example, push transmitting unit 32 can be prevented from directly contacting panel 15 by decreasing the distance between a lower surface of a part of upper portion 88 having a flange shape and an upper surface of inner supporting unit 42 to be smaller than the distance between the lower surface of push transmitting unit 32 and the upper surface of base portion 36.

Rotation transmitting unit 26 rotates about axis a in conjunction with rotation of dial type operation unit 22, and thus the operability of a rotating operation is improved. Push transmitting unit 32 approaches surface 16 of panel 15 in conjunction with pushing of button type operation unit 24, and thus the operability of a push operation is improved.

As described above, operation knob 20 is bonded to panel 15 with an adhesive or a double-sided tape. In addition, operation knob 20 may be attached to panel 15 by techniques other than bonding. For example, operation knob 20 may be fit to panel 15 by forming a male screw in the outer wall of base portion 36 and forming a female screw in the inner wall of a recessed portion disposed in panel 15. This configuration improves the degree of design freedom. This configuration may be applied to another operation knob according to the present embodiment and other embodiments.

The surfaces of rotation transmitting unit 26 and push transmitting unit 32 facing panel 15 are flat. However, the surfaces are not limited thereto. For example, the surface of rotation transmitting unit 26 or push transmitting unit 32 facing panel 15 may have a shape protruding at the center thereof. The shape of surface 16 of panel 15 has a flat surface. However, surface 16 of panel 15 may have a curved surface. This configuration improves the degree of design freedom. This configuration may be applied to another operation knob according to the present embodiment or other embodiments.

Operation knob 120 will be described with reference to FIG. 9. FIG. 9 is a sectional view of operation knob 120 according to the present embodiment. Operation knob 120 is attached onto panel 15 of display device 100 illustrated in FIG. 2, similarly to operation knob 20. While operation knob 20 includes dial type operation unit 22 and button type operation unit 24, operation knob 120 includes only dial type operation unit 122. Differences from operation knob 20 will be mainly described below.

Operation knob 120 includes dial type operation unit 122, rotation transmitting unit 126, connecting unit 128, rotating unit 130, and housing 134. Dial type operation unit 122 includes upper portion 180, outer wall portion 182, and inner wall portion 184. Housing 134 includes base portion 136 and outer supporting unit 140.

Dial type operation unit 122, rotation transmitting unit 126, connecting unit 128, rotating unit 130, and housing 134 of operation knob 120 respectively correspond to dial type operation unit 22, rotation transmitting unit 26, connecting unit 28, rotating unit 30, and housing 34 of operation knob 20. Upper portion 180, outer wall portion 182, inner wall portion 184, base portion 136, attachment surface 138, and outer supporting unit 140 respectively correspond to upper portion 80, outer wall portion 82, inner wall portion 84, base portion 36, attachment surface 38, and outer supporting unit 40 of operation knob 20.

Operation knob 120 does not include button type operation unit 24 and inner supporting unit 42 shown in FIG. 5. Thus, central portion 186 disposed at the center of base portion 136 is exposed in the case where central portion 186 is viewed from above. Furthermore, attachment surface 138 and panel 15 may be bonded with a transparent adhesive or a transparent double-sided tape. Base portion 136 may be made of transparent material. In this case, the operator can visually recognize an image displayed on panel 15 contacting central portion 186. A touch button may be displayed in this part. Dial type operation unit 122 can be thus combined with the touch button. In addition, since operation knob 120 does not include a button type operation unit, the configuration thereof is simple.

Operation knob 220 will be described with reference to FIG. 10 below. FIG. 10 is a sectional view of operation knob 220 according to the present embodiment. Operation knob 220 is attached onto panel 15 of display device 100 illustrated in FIG. 2, similarly to operation knob 20. While operation knob 20 includes dial type operation unit 22 and button type operation unit 24, operation knob 220 includes only button type operation unit 224. Differences from operation knob 20 will be mainly described below.

Operation knob 220 includes button type operation unit 224, push transmitting unit 232, and housing 234. Button type operation unit 224 includes upper portion 288 and protruding portion 290. Housing 234 includes base portion 236 and inner supporting unit 242.

Button type operation unit 224, push transmitting unit 232, and housing 234 of operation knob 220 correspond to button type operation unit 24, push transmitting unit 32, and housing 34 of operation knob 20, respectively. Upper portion 288, protruding portion 290, base portion 236, attachment surface 238, and inner supporting unit 242 correspond to upper portion 88, protruding portion 90, base portion 36, attachment surface 38, and inner supporting unit 42 of operation knob 20, respectively. Button type operation unit 224 is a button type operation unit pushable in a direction substantially perpendicular to surface 16 of panel 15, similarly to button type operation unit 24. Push transmitting unit 232 approaches surface 16 of panel 15 in conjunction with pushing of button type operation unit 224.

Operation knob 220 does not thus include a dial type operation unit, and have a simple configuration.

Figure 11:
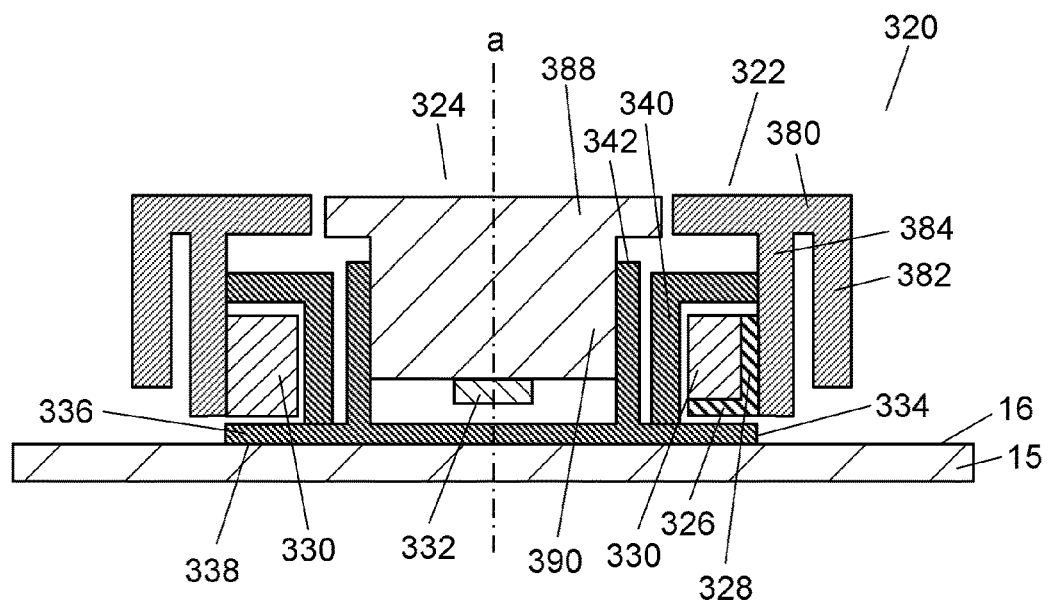
FIG. 11 is a sectional view of a further operation knob according to the first exemplary embodiment of the present invention.

Operation knob 320 will be described below with reference to FIG. 11. FIG. 11 is a sectional view of operation knob 320 according to the present embodiment. Operation knob 320 is attached onto panel 15 of display device 100 illustrated in FIG. 2, similarly to operation knob 20. The direction in which an outer supporting unit supports an inner wall portion of operation knob 320 is different from the direction of that of operation knob 20. Differences from operation knob 20 will be mainly described below.

Operation knob 320 includes dial type operation unit 322, button type operation unit 324, rotation transmitting unit 326, connecting unit 328, rotating unit 330, push transmitting unit 332, and housing 334. Dial type operation unit 322 includes upper portion 380, outer wall portion 382, and inner wall portion 384. Button type operation unit 324 includes upper portion 388 and protruding portion 390. Housing 334 includes base portion 336, outer supporting unit 340, and inner supporting unit 342.

Base portion 336, attachment surface 338, inner supporting unit 342, button type operation unit 324, upper portion 388, protruding portion 390, and push transmitting unit 332 correspond to base portion 36, attachment surface 38, inner supporting unit 42, button type operation unit 24, upper portion 88, protruding portion 90, and push transmitting unit 32 of operation knob 20, respectively. Upper portion 380 and outer wall portion 382 correspond to upper portion 80 and outer wall portion 82 of operation knob 20, respectively.

Outer supporting unit 340 includes a tubular portion having an annular shape standing on the outer side from inner supporting unit 342 of base portion 336, and includes a plate ring portion extending outward from the upper portion of the tubular portion. Outer supporting unit 340 supports inner wall portion 384 of dial type operation unit 322, described later, in the outer edge of the plate ring portion while allowing inner wall portion 384 to rotate, thereby allowing dial type operation unit 322 to rotate about axis a.

Inner wall portion 384 extends downward from a position inside outer wall portion 382. A part of the inner surface of inner wall portion 384 is rotatably supported by outer supporting unit 340 of housing 334, similarly to that a part of the outer surface of inner wall portion 84 is rotatably supported by outer supporting unit 40 in operation knob 20. Connecting unit 328 is disposed at the outer edge of rotation transmitting unit 326. Connecting unit 328 is connected to the lower part of the inner surface of inner wall portion 384 (inner wall portion 384 on the right side of FIG. 11).

As illustrated in FIG. 5, outer supporting unit 40 is disposed on the outer side from inner wall portion 84. Outer supporting unit 40 supports dial type operation unit 22 from the outer side of dial type operation unit 22 of operation knob 20. Meanwhile, as illustrated in FIG. 11, outer supporting unit 340 is disposed on the inner side from inner wall portion 384. Outer supporting unit 340 supports dial type operation unit 322 from the inner side of dial type operation unit 322 of operation knob 320.

A configuration that supports a dial type operation unit can thus be changed, and the degree of design freedom is improved.

Figure 12:
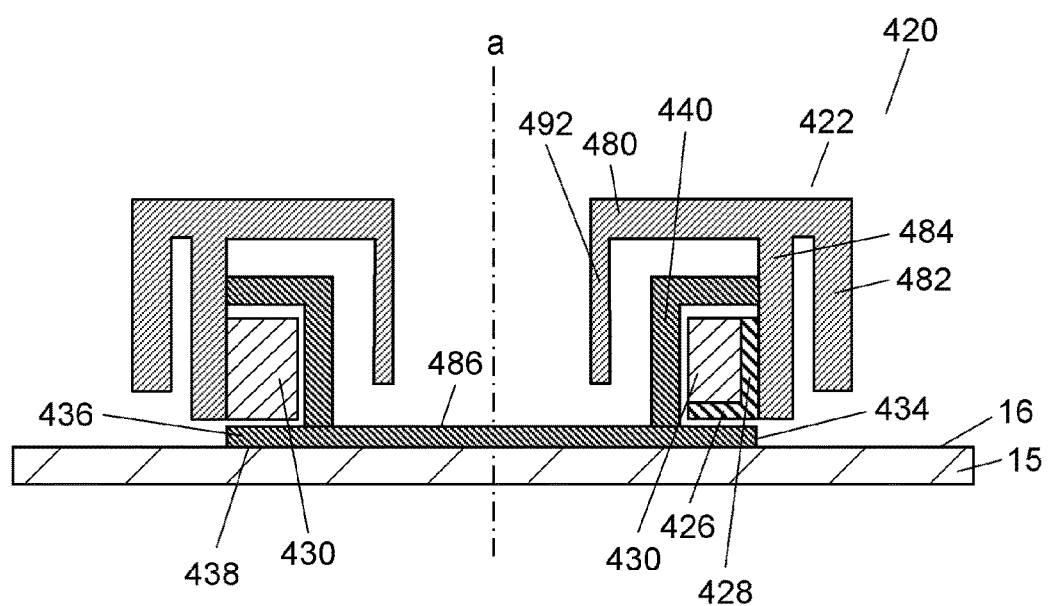
FIG. 12 is a sectional view of a further operation knob according to the first exemplary embodiment of the present invention.

Operation knob 420 will be described below with reference to FIG. 12. FIG. 12 is a sectional view of operation knob 420 according to the present embodiment. Operation knob 420 is attached onto panel 15 of display device 100 illustrated in FIG. 2, similarly to operation knob 20. While operation knob 320 illustrated in FIG. 11 includes dial type operation unit 322 and button type operation unit 324, operation knob 420 includes only dial type operation unit 422. Differences from operation knob 320 will be mainly described below.

Operation knob 420 includes dial type operation unit 422, rotation transmitting unit 426, connecting unit 428, rotating unit 430, and housing 434. Dial type operation unit 422 includes upper portion 480, outer wall portion 482, inner wall portion 484, and innermost wall portion 492. Housing 434 includes base portion 436 and outer supporting unit 440.

Dial type operation unit 422, rotation transmitting unit 426, connecting unit 428, rotating unit 430, and housing 434 of operation knob 420 correspond to dial type operation unit 322, rotation transmitting unit 326, connecting unit 328, rotating unit 330, and housing 334 of operation knob 320, respectively. Upper portion 480, outer wall portion 482, inner wall portion 484, base portion 436, attachment surface 438, and outer supporting unit 440 correspond to upper portion 380, outer wall portion 382, inner wall portion 384, base portion 336, attachment surface 338, and outer supporting unit 340 of operation knob 320, respectively.

Innermost wall portion 492 has an annular shape extending downward from the inner edge of upper portion 480. Innermost wall portion 492 prevents a connected part between inner wall portion 484 and outer supporting unit 440 from being exposed. Operation knob 420 does not include button type operation unit 324 and inner supporting unit 342 shown in FIG. 11. Thus, central portion 486 disposed at the center of base portion 436 is exposed in a case where central portion 486 is viewed from above.

A configuration that supports a dial type operation unit can be changed in contrary to operation knob 120 illustrated in FIG. 9, and the degree of design freedom is improved.

Second Exemplary Embodiment

Figure 13:
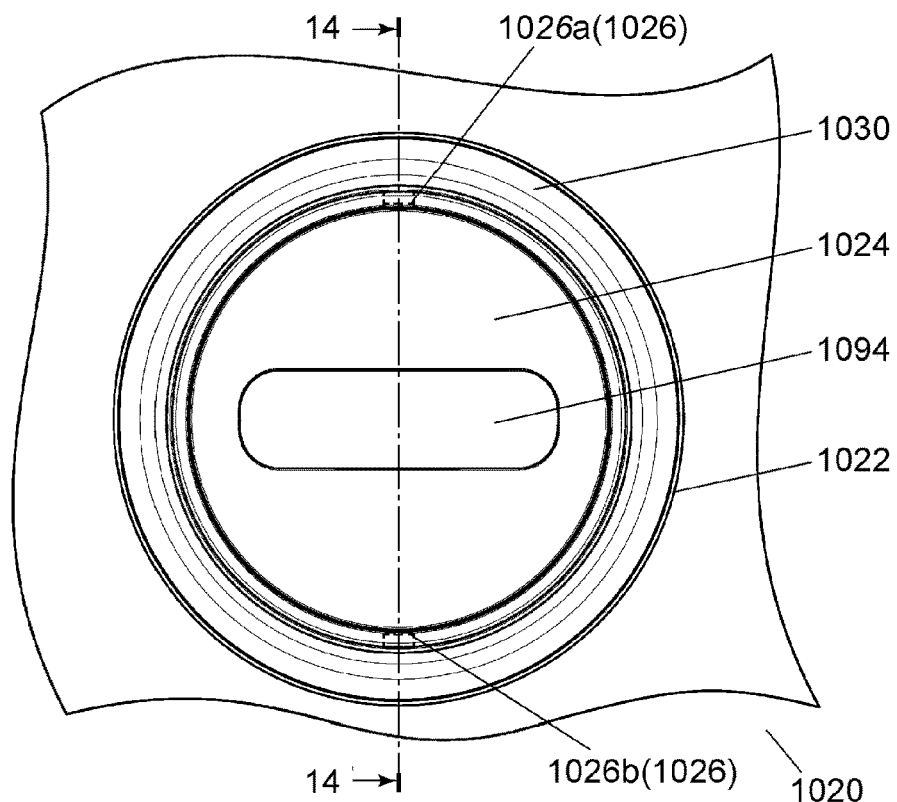
FIG. 13 is a front view of an operation knob according to a second exemplary embodiment of the present invention.
Figure 14:
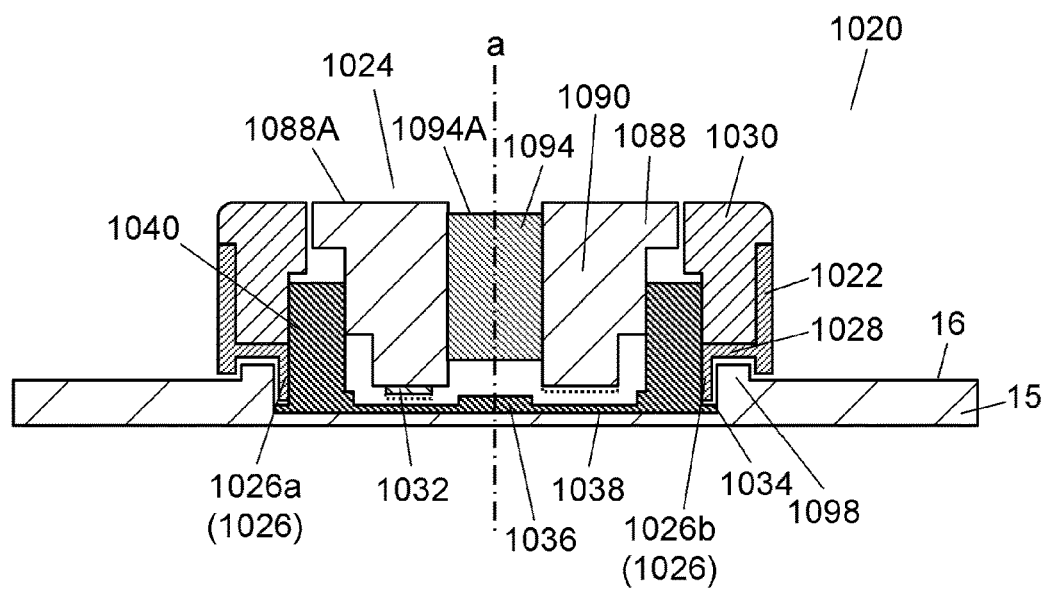
FIG. 14 is a sectional view of the operation knob illustrated in FIG. 13.

Operation knob 1020 according to a second exemplary embodiment will be described below with reference to FIG. 13 and FIG. 14. FIG. 13 is a front view of operation knob 1020 according to the present embodiment. FIG. 14 is a sectional view of the operation knob along line 14-14 illustrated in FIG. 13. Operation knob 1020 is attached onto panel 15 of display device 100 illustrated in FIG. 2, similarly to operation knob 20 in accordance with the first embodiment. A through-hole is provided in button type operation unit 1024 of operation knob 1020. Light guiding unit 1094 that transmits light from panel 15 is disposed in the through-hole. The same configurations as in the first exemplary embodiment will be denoted by the same reference signs and will not be detailed.

When it becomes dark around display device 100 illustrated in FIG. 1 and FIG. 2, visibility of an operation knob is degraded. When the visibility is degraded, the operability of the operation knob is affected adversely. Thus, the visibility of the operation knob is required to improve. Therefore, light guiding unit 1094 that transmits light from panel 15 is disposed in operation knob 1020.

Button type operation unit 1024 has a circular shape and is disposed at the center of operation knob 1020. Button type operation unit 1024 is a push button and is pushed by the operator to be operated. Light guiding unit 1094 is disposed at the center of button type operation unit 1024. As illustrated in FIG. 13, light guiding unit 1094 has substantially a rectangular shape extending more slenderly in the leftward and rightward directions than in the upward and downward directions, and transmits light from panel 15. Since the angles of the four corners of the rectangular shape are rounded to provide the substantially rectangular shape of light guiding unit 1094 as illustrated, the term "substantially" means a nearly or roughly rectangular shape. Rotating unit 1030 has a circular annular shape and is disposed around button type operation unit 1024. Dial type operation unit 1022 having a ring shape is connected to the side surface portion of rotating unit 1030. Dial type operation unit 1022 can rotate clockwise and counterclockwise together with rotating unit 1030. The operator rotates dial type operation unit 1022 to operate dial type operation unit 1022.

In description below, upward and downward directions and leftward and rightward directions will be based on the positional relationship illustrated in FIG. 14. Operation knob 1020 includes dial type operation unit 1022, button type operation unit 1024, first rotation transmitting unit 1026a and second rotation transmitting unit 1026b, connecting unit 1028, rotating unit 1030, push transmitting unit 1032, light guiding unit 1094, and housing 1034. Dial type operation unit 1022, button type operation unit 1024, first rotation transmitting unit 1026a and second rotation transmitting unit 1026b collectively constitute rotation transmitting unit 1026. Button type operation unit 1024 includes upper portion 1088 and protruding portion 1090. Housing 1034 includes base portion 1036 and supporting unit 1040. Housing 1034 is made of non-conductive material, such as plastic.

Base portion 1036 has a circular plate shape. The radius of base portion 1036 is greater than the distance from axis a to rotation transmitting unit 1026, and is smaller than the radius of annular dial type operation unit 1022. The lower surface of base portion 1036 constitutes attachment surface 1038 for attaching operation knob 1020 to panel 15. Attachment surface 1038 may be bonded to panel 15 with an adhesive or a double-sided tape.

A part of panel 15 illustrated in FIG. 14 to which attachment surface 1038 of base portion 1036 is attached has a shape that is recessed in the downward direction with respect to other parts of panel 15 and that can accommodate base portion 1036 having a circular plate shape. Water blocking wall 1098 having a ring shape stands around this part. Water blocking wall 1098 blocks water flowing from the outside of operation knob 1020 to the inside of operation knob 1020 along surface 16 of panel 15. Panel 15 thus has a shape that is recessed in the part to which attachment surface 1038 of base portion 1036 is attached and that protrudes at water blocking wall 1098. Surface 16 is the uppermost portion of the recessed part to which attachment surface 1038 is attached and water blocking wall 1098. That is, surface 16 has unevenness according to the shape of panel 15. Panel 15 and surface 16 may have a flat shape that does not have unevenness.

Supporting unit 1040 has an annular shape and stands between button type operation unit 1024 and rotating unit 1030 of base portion 1036. The outer surface of supporting unit 1040 supports the inner surface of rotating unit 1030 while allowing the inner surface of rotating unit 1030 to rotate, thereby allowing dial type operation unit 1022 connected with rotating unit 1030 to rotate about axis a. In addition, supporting unit 1040 supports protruding portion 1090 of button type operation unit 1024 on the inner surface thereof while allowing protruding portion 1090 to be movable in the upward and downward directions, thereby allowing button type operation unit 1024 to be pushed. That is, button type operation unit 1024 includes operation surface 1088A on the opposite side of panel 15.

Rotating unit 1030 has substantially a circular tubular shape and is made of non-conductive material. The lower portion of the inner surface of rotating unit 1030 is rotatably supported by supporting unit 1040 of housing 1034 as described above. Meanwhile, dial type operation unit 1022 having an annular shape is connected to the outer surface of rotating unit 1030. When the operator operates dial type operation unit 1022 having the above configuration, operation unit 1022 rotates about axis a substantially perpendicular to surface 16 of panel 15.

First rotation transmitting unit 1026a and second rotation transmitting unit 1026b have rectangular shapes in a case where operation knob 1020 is seen through from the front as illustrated in FIG. 13. First rotation transmitting unit 1026a and second rotation transmitting unit 1026b are disposed at positions which are aligned on a diameter of the circular shape of operation knob 1020 and which are symmetrical to each other with respect to the center of the circular shape. First rotation transmitting unit 1026a and second rotation transmitting unit 1026b have sizes required for being sensed by the sensor of panel 15. Rotation transmitting unit 1026 is disposed at a position distant from surface 16 of panel 15 in the upward and downward directions, and faces panel 15 across base portion 1036 of housing 1034. Connecting unit 1028 is disposed on the outer edge of rotation transmitting unit 1026, and is connected to the lower part of the inner surface of dial type operation unit 1022. Dial type operation unit 1022, rotation transmitting unit 1026, and connecting unit 1028 may be integrated or may be formed individually. Since dial type operation unit 1022 and rotation transmitting unit 1026 are connected with connecting unit 1028, rotation transmitting unit 1026 rotates about axis a in conjunction with rotation of dial type operation unit 1022.

Dial type operation unit 1022, connecting unit 1028, and rotation transmitting unit 1026 are made of conductive material, such as metal or conductive resin. Dial type operation unit 1022 and rotation transmitting unit 1026 may be made of the same material or may be made of different material. Dial type operation unit 1022 and rotation transmitting unit 1026 made of conductive material are electrically connected to each other. Thus, when the operator contacts dial type operation unit 1022, electric charges concentrate to rotation transmitting unit 1026 similarly to a tip of a finger, thus allowing the position of rotation transmitting unit 1026 to be detected by the sensor of panel 15. Furthermore, since rotation transmitting unit 1026 rotates in conjunction with a rotating operation performed to dial type operation unit 1022, the sensor of panel 15 detects the position of rotation transmitting unit 1026 corresponding to the rotating operation. Rotation transmitting unit 1026 thus transmits, to panel 15, an operation performed by the operator to dial type operation unit 1022 at in a position distant from surface 16 of panel 15.

Upper portion 1088 has a circular plate shape and is surrounded by rotating unit 1030 having an annular shape. Protruding portion 1090 protrudes downward from the center of the lower surface of upper portion 1088. Protruding portion 1090 has a circular columnar shape having a diameter smaller than the diameter of upper portion 1088. As described above, protruding portion 1090 is supported movably in the upward and downward directions by the inner surface of supporting unit 1040 of housing 1034. Upper portion 1088 and protruding portion 1090 may be integrated or may be formed individually. When the operator pushes upper portion 1088 having the above configuration, button type operation unit 1024 is pushed in a direction substantially perpendicular to surface 16 of panel 15.

Push transmitting unit 1032 is disposed on the lower surface of protruding portion 1090. Push transmitting unit 1032 approaches surface 16 of panel 15 in conjunction with pushing of button type operation unit 1024. However, push transmitting unit 1032 is maintained to be distant from surface 16 of panel 15 in the upward and downward directions even when button type operation unit 1024 is pushed. Push transmitting unit 1032 faces panel 15 across housing 1034 similarly to rotation transmitting unit 1026. Push transmitting unit 1032 may constitutes as a further transmitting unit in the case that push transmitting unit 1032 is disposed in addition to rotation transmitting unit 1026 of dial type operation unit 1022. Upon the operator moving a finger away from upper portion 1088, button type operation unit 1024 rises to return from the pushed state to the original state. Therefore, an elastic body, such as a rubber or a plate spring, not illustrated may be disposed.

Button type operation unit 1024 and push transmitting unit 1032 are made of conductive material and are electrically connected to each other similarly to dial type operation unit 1022. Button type operation unit 1024 and push transmitting unit 1032 may be made of the same material or may be made of different material. When the operator contacts button type operation unit 1024 to perform a push operation to button type operation unit 1024, push transmitting unit 1032 is accordingly pushed in conjunction with the pushing of the button type operation unit. Electric charges concentrate to the pushed position on push transmitting unit 1032 similarly to a tip of a finger. Push transmitting unit 1032 thus transmits, to panel 15, a push operation performed by the operator to button type operation unit 1024.

A dotted line shown in FIG. 14 denotes the positions of push transmitting unit 1032 and the lower surface of protruding portion 1090 in a case where button type operation unit 1024 is pushed. As shown in FIG. 14, the interval between push transmitting unit 1032 and surface 16 in a case where button type operation unit 1024 is pressed is substantially equal to the interval between rotation transmitting unit 1026 and surface 16. Upon describing it with the distance between push transmitting unit 1032 and rotation transmitting unit 1026, the distance between push transmitting unit 1032 and rotation transmitting unit 1026 after the pushing is shorter than the distance between push transmitting unit 1032 and rotation transmitting unit 1026 before the pushing. The basic configuration described above is substantially the same as operation knob 20.

Button type operation unit 1024 includes operation surface 1088A on the opposite side of panel 15. A through-hole is provided in the center of button type operation unit 1024, and extends in the upward and downward directions from operation surface 1088A to panel 15. Light guiding unit 1094 is disposed in the through-hole with, e.g. an adhesive. Light guiding unit 1094 has first end portion 1094A on the opposite side of panel 15. Light guiding unit 1094 is made of light-transmissive non-conductive material, transmits light incident from panel 15, and outputs the light from the upper portion of light guiding unit 1094. The light improves the visibility of button type operation unit 1024 even if the ambient environment is dark. Furthermore, since panel 15 is a source of the light, the color of illumination of light guiding unit 1094 is changed just by changing the color of display light in panel 15. The conductive material forming button type operation unit 1024 may not have sufficient transmissivity. In this case, a button type operation unit which does not include light guiding unit 1094 is not illuminated. Meanwhile, light guiding unit 1094 having transmissivity is disposed in button type operation unit 1024 as to indirectly illuminate button type operation unit 1024.

If the operator contacts only light guiding unit 1094 and does not contact operation surface 1088A of upper portion 1088 of button type operation unit 1024 in such a configuration, the push operation performed by the operator is not transmitted from push transmitting unit 1032 to panel 15. Thus, the operator is required to securely contact the operation surface of button type operation unit 1024. In order to deal with this, first end portion 1094A of light guiding unit 1094 is preferably disposed at a position closer to panel 15 than operation surface 1088A of button type operation unit 1024, as illustrated in FIG. 14. That is, first end portion 1094A of light guiding unit 1094 is preferably disposed below operation surface 1088A. This configuration prevents the finger of the operator from contacting only light guiding unit 1094.

First end portion 1094A of light guiding unit 1094 shown in FIG. 13 preferably has a width greater than 0 mm and smaller than or equal to 8.6 mm at the narrowest part thereof. When the operator of operation knob 1020 is assumed to be aged three or more, it is preferable to comply with toy safety standards and the International Electrotechnical Commission (IEC) standards. In these standards, the diameter of a child test finger is determined to be 8.6 mm for children aged 3 to 14. Button type operation unit 1024 may have a shape in which the finger either contacts button type operation unit 1024 or contacts button type operation unit 1024 and light guiding unit 1094 simultaneously.

The configuration of display device 100 is the same as the content described in the first embodiment with reference to FIG. 6 and thus will not be described.

Control unit 52 may control whether or not a push operation can be performed to button type operation unit 1024, and may instruct display processing unit 58 to change display color in accordance with whether or not the push operation can be performed. Display processing unit 58 changes color displayed on display unit 66 in response to the received instruction in order to change the color of light output from light guiding unit 1094. For example, display processing unit 58 illuminates a part of display unit 66 corresponding to light guiding unit 1094 in blue color if the push operation can be performed, or illuminates the part in red color if the push operation cannot be performed.

Figure 15:
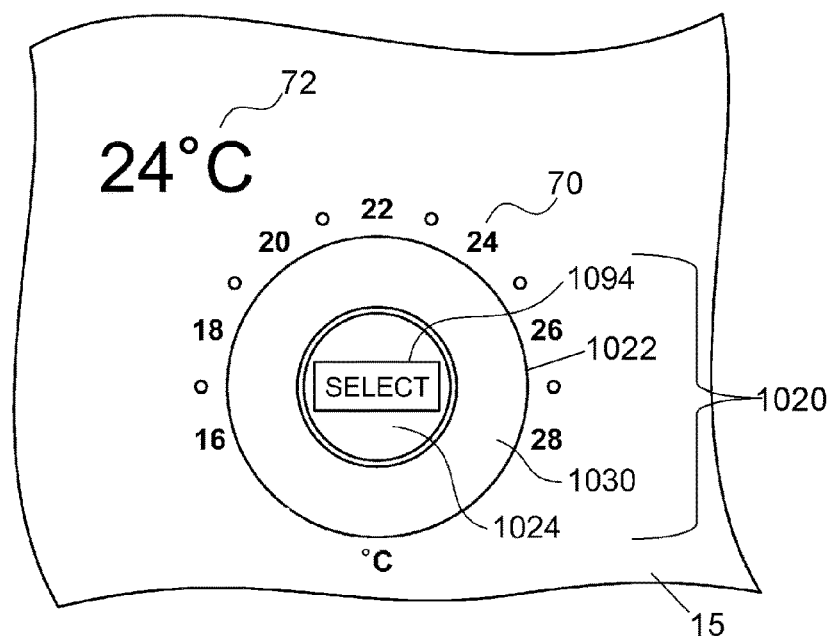
FIG. 15 illustrates a screen displayed in the case where the operation knob illustrated in FIG. 13 is mounted on the touch functional display panel shown in FIG. 2.

FIG. 15 illustrates a screen displayed on panel 15. This screen illustrates a case of performing the function of the temperature adjusting interface in control unit 52. Temperature setting using temperature scale 70, temperature-setting indicator 72, and operation knob 1020 and the system of turning on and off of the air conditioner are the same as described in the first embodiment with reference to FIG. 7 and thus will not be described.

Figure 16:
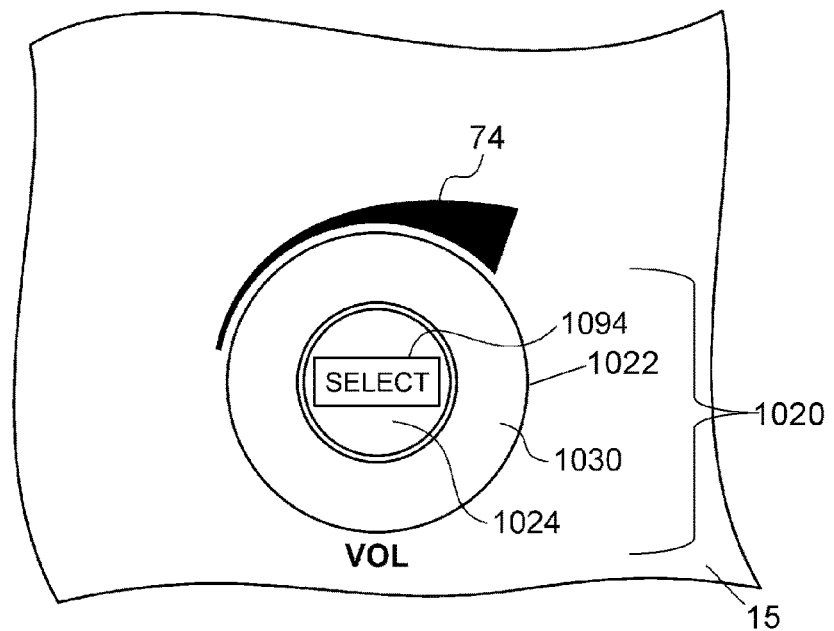
FIG. 16 illustrates another screen displayed in the case where the operation knob illustrated in FIG. 13 is mounted on the touch functional display panel shown in FIG. 2.

FIG. 16 illustrates another screen displayed on panel 15. This screen illustrates a case of performing the car audio function or the car navigation function in control unit 52. Volume level setting using volume level display 74 and operation knob 1020 and the system of turning on and off of loudspeaker 56 are the same as described in the first embodiment with reference to FIG. 8 and thus will not be described.

Control unit 52 illustrated in FIG. 6 changes the color of light output from light guiding unit 1094 in accordance with whether or not a push operation can be performed to button type operation unit 1024. As described above, if the push operation can be performed, a part of light guiding unit 1094 that is illustrated as "SELECT" is illuminated in blue color. If the push operation cannot be performed, the part of light guiding unit 1094 illustrated as "SELECT" is illuminated in red color.

As described above, operation knob 1020 provides the same effect as operation knob 20. In addition, since light guiding unit 1094 is disposed in button type operation unit 1024, light from panel 15 can be output to operation surface 1088A. This configuration improves the visibility of operation knob 1020 and the operability of operation knob 1020. In addition, since light guiding unit 1094 has light-transmissivity, light guiding unit 1094 can be illuminated even if button type operation unit 1024 is made of conductive material. In addition, since light from panel 15 is output, the color of light can be changed easily by changing the display color of panel 15, thus improving the operability. In addition, since first end portion 1094A of light guiding unit 1094 is positioned below operation surface 1088A of button type operation unit 1024, the operator can securely contacts button type operation unit 1024.

As described above, light guiding unit 1094 has substantially a rectangular shape extending more slenderly in the leftward and rightward directions than in the upward and downward directions. The angles of the four corners of the rectangular shape are rounded in a front view. However, the shape of light guiding unit 1094 is not limited thereto. Light guiding unit 1094 may have other shapes, such as a rectangular shape, a triangular shape, or a circular shape. This configuration can improve the degree of design freedom. This configuration may be applied to other operations knob according to the present embodiment.

Light guiding unit 1094 is disposed at the center of button type operation unit 1024 while rotating unit 1030 and dial type operation unit 1022 are disposed around button type operation unit 1024. However, light guiding unit 1094, rotating unit 1030, and dial type operation unit 1022 are not limited thereto. For example, in the case that which the knob does not include button type operation unit 1024, rotating unit 1030 or dial type operation unit 1022 may extend to the part at which button type operation unit 1024 is disposed. In this case, light guiding unit 1094 is disposed in a through-hole in the center of rotating unit 1030 or dial type operation unit 1022. Dial type operation unit 1022 and rotating unit 1030 can thus be illuminated even in an operation knob to which only a rotating operation is performed.

Two rotation transmitting units 1026 are disposed in operation knob 1020. However, the number of rotation transmitting units 1026 is not limited thereto. For example, single rotation transmitting unit 1026 may be provided. This configuration can improve the degree of design freedom.

Figure 17:
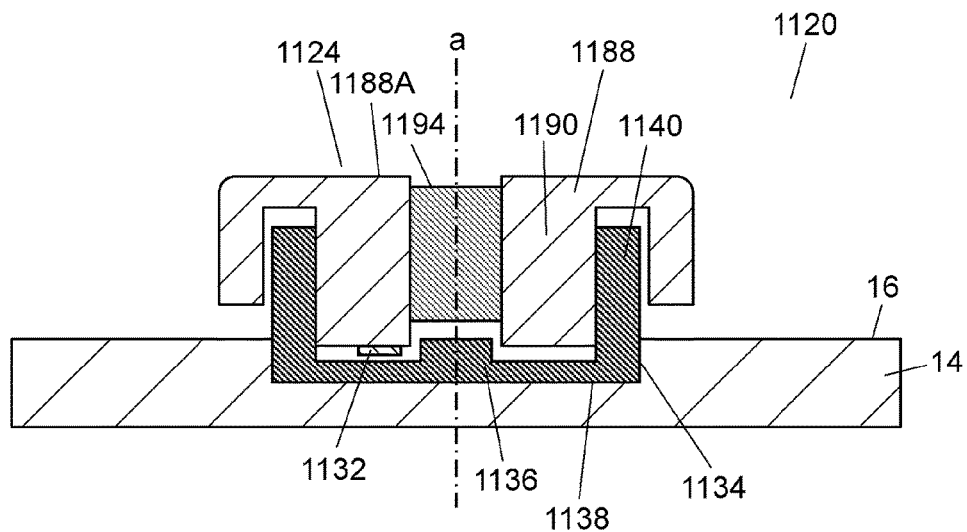
FIG. 17 is a sectional view of another operation knob according to the second exemplary embodiment of the present invention.

Operation knob 1120 will be described below with reference to FIG. 17. FIG. 17 is a sectional view of operation knob 1120 according to the present embodiment. Operation knob 1120 is attached onto panel 15 of display device 100 illustrated in FIG. 2, similarly to operation knob 1020. While operation knob 1020 includes dial type operation unit 1022 and button type operation unit 1024, operation knob 1120 includes only button type operation unit 1124. Differences from operation knob 1020 will be mainly described below.

Operation knob 1120 includes button type operation unit 1124, push transmitting unit 1132, light guiding unit 1194, and housing 1134. Button type operation unit 1124 includes upper portion 1188 and protruding portion 1190. Housing 1134 includes base portion 1136 and supporting unit 1140.

Button type operation unit 1124, push transmitting unit 1132, light guiding unit 1194, and housing 1134 correspond to button type operation unit 1024, push transmitting unit 1032, light guiding unit 1094, and housing 1034 of operation knob 1020, respectively. Upper portion 1188, operation surface 1188A, protruding portion 1190, base portion 1136, attachment surface 1138, and supporting unit 1140 correspond to upper portion 1088, operation surface 1088A, protruding portion 1090, base portion 1036, attachment surface 1038, and supporting unit 1040 of operation knob 1020, respectively.

Operation knob 1120 does not include dial type operation unit 1022, rotation transmitting unit 1026, connecting unit 1028, and rotating unit 1030 shown in FIG. 14. Upper portion 1188 of button type operation unit 1124 constitutes the upper surface side operation part of button type operation unit 1124 similarly to operation knob 1020. Upper portion 1188 extends downward from the outside of supporting unit 1140. This part constitutes the side surface side operation part of button type operation unit 1124.

Operation knob 1120 does not include a dial type operation unit and includes button type operation unit 1124, thus having a simple configuration. In addition, since the area of an exposed part of button type operation unit 1124 is increased, the operator can securely contact button type operation unit 1124.

Figure 18:
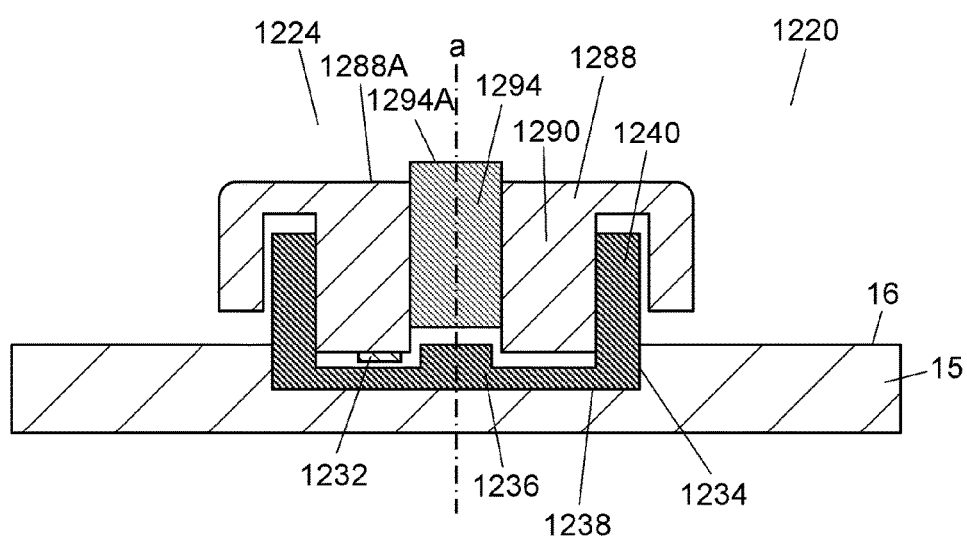
FIG. 18 is a sectional view of still another operation knob according to the second exemplary embodiment of the present invention.

Operation knob 1220 will be described below with reference to FIG. 18. FIG. 18 is a sectional view of operation knob 1220 according to the present embodiment. Operation knob 1220 is attached onto panel 15 in display device 100 illustrated in FIG. 2, similarly to operation knob 1020. Operation knob 1220 includes light guiding unit 1294 having a shape different from that of light guiding unit 1194 of operation knob 1120. Differences from operation knob 1120 will be mainly described below.

Operation knob 1220 includes button type operation unit 1224, push transmitting unit 1232, light guiding unit 1294, and housing 1234. Button type operation unit 1224 includes upper portion 1288 and protruding portion 1290. Housing 1234 includes base portion 1236 and supporting unit 1240.

Button type operation unit 1224, push transmitting unit 1232, light guiding unit 1294, and housing 1234 of operation knob 1220 correspond to button type operation unit 1124, push transmitting unit 1132, light guiding unit 1194, and housing 1134 of operation knob 1120, respectively. Upper portion 1288, operation surface 1288A, protruding portion 1290, base portion 1236, attachment surface 1238, and supporting unit 1240 correspond to upper portion 1188, operation surface 1188A, protruding portion 1190, base portion 1136, attachment surface 1138, and supporting unit 1140 of operation knob 1120, respectively.

As described above, a configuration to allow the operator to securely contact operation surface 1288A of button type operation unit 1224 is required. In order to deal with this, first end portion 1294A of light guiding unit 1294 of operation knob 1220, unlike operation knobs 1020 and 1120, is disposed at a position more distant from panel 15 than the operation surface of button type operation unit 1224, as illustrated in FIG. 18. That is, first end portion 1294A that is located on the opposite side of light guiding unit 1294 from panel 15 is positioned above operation surface 1288A of button type operation unit 1224. This configuration allows the operator to recognize that a finger of the operator contacts only light guiding unit 1294. Thus, the operator performs a push operation again to contact operation surface 1288A of button type operation unit 1224. As in the description of operation knob 1020 with reference to FIG. 13, first end portion 1294A of light guiding unit 1294 has a width of smaller than or equal to 8.6 mm at the narrowest part thereof.

As described heretofore, operation knob 1220 does not include a dial type operation unit, and includes button type operation unit 1224 similarly to operation knob 1120, thus having a simple configuration. In addition, since the area of an exposed part of button type operation unit 1224 is increased, the operator can securely contact button type operation unit 1224. In addition, since first end portion 1294A of light guiding unit 1294 is disposed above operation surface 1288A of button type operation unit 1224, the operator can recognize that the operator contacts only light guiding unit 1294.

Figure 19:
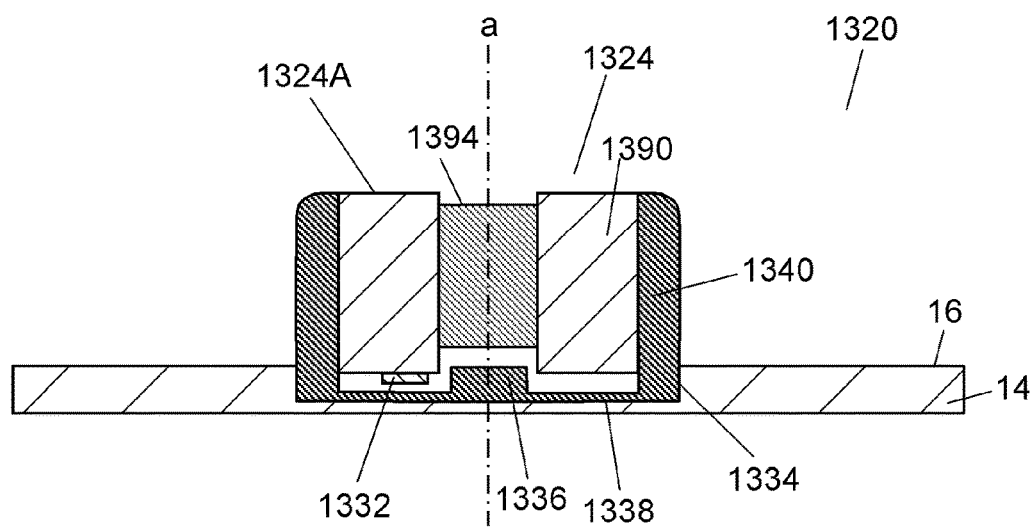
FIG. 19 is a sectional view of a further operation knob according to the second exemplary embodiment of the present invention.

Operation knob 1320 will be described with reference to FIG. 19 below. FIG. 19 is a sectional view of operation knob 1320 according to the present embodiment. Operation knob 1320 is attached onto panel 15 in display device 100 illustrated in FIG. 2, similarly to operation knob 1020. Operation knob 1320 includes button type operation unit 1324 having a shape different from that of button type operation unit 1124 of operation knob 1120. Differences from operation knob 1120 will be mainly described below.

Operation knob 1320 includes button type operation unit 1324, push transmitting unit 1332, light guiding unit 1394, and housing 1334. Button type operation unit 1324 includes protruding portion 1390. Housing 1334 includes base portion 1336 and supporting unit 1340.

Button type operation unit 1324, push transmitting unit 1332, light guiding unit 1394, and housing 1334 of operation knob 1320 correspond to button type operation unit 1124, push transmitting unit 1132, light guiding unit 1194, and housing 1134 of operation knob 1120, respectively. Protruding portion 1390, base portion 1336, attachment surface 1338, and supporting unit 1340 correspond to protruding portion 1190, base portion 1136, attachment surface 1138, and supporting unit 1140 of operation knob 1120, respectively.

Button type operation unit 1324 has a diameter smaller than the diameter of the inner surface of annular supporting unit 1340, and is accommodated in supporting unit 1340 without protruding from supporting unit 1340 in a case where button type operation unit 1324 is viewed from the front side thereof. Thus, operation knob 1320 does not include an operation part on the side surface thereof, and only operation surface 1324A is exposed.

As described above, since button type operation unit 1324 is accommodated without protruding from supporting unit 1340 in a case where button type operation unit 1324 is viewed from the front, operation knob 1320 is small. Thins configuration prevents the display area of panel 15 other than where operation knob 1320 is disposed from decreasing. In addition, since the decrease in the display area is prevented, operation knob 1320 can be easily attached even if the display size of panel 15 is small.

Third Exemplary Embodiment

Figure 20:
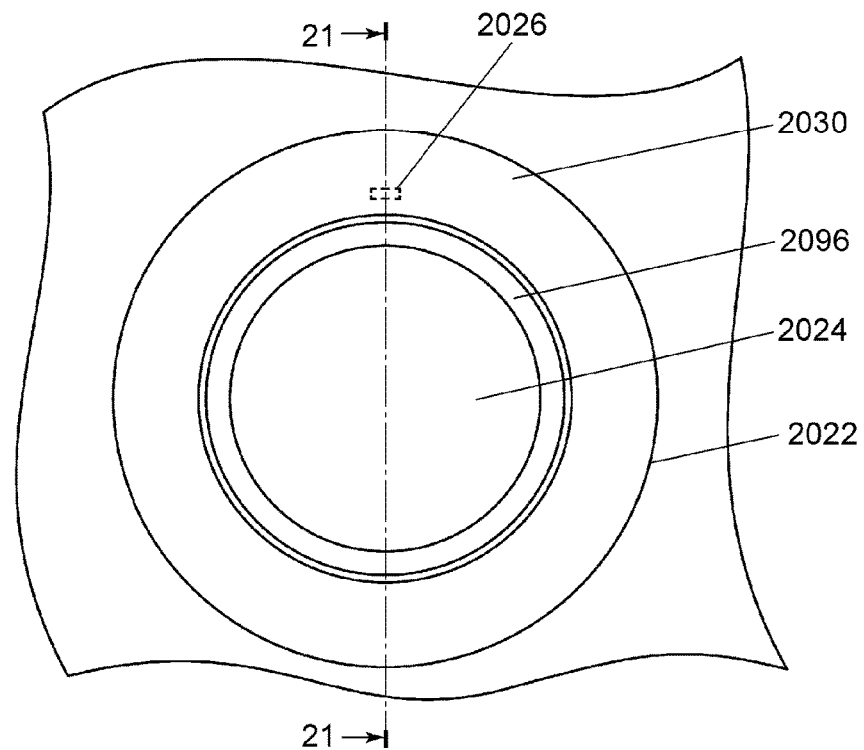
FIG. 20 is a front view of an operation knob according to a third exemplary embodiment of the present invention.
Figure 21:
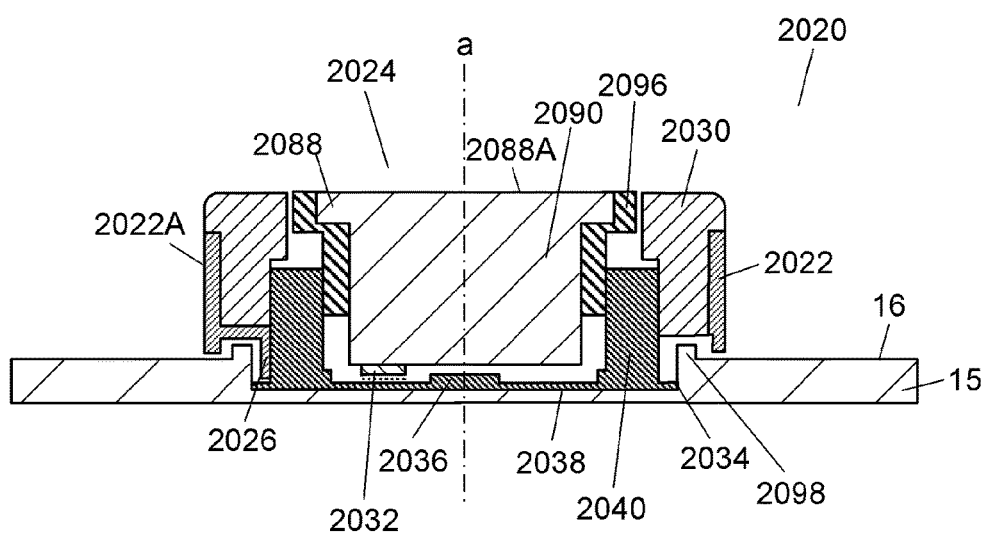
FIG. 21 is a sectional view of the operation knob illustrated in FIG. 20.

Operation knob 2020 according to a third exemplary embodiment will be described with reference to FIG. 20 and FIG. 21. FIG. 20 is a front view of operation knob 2020 according to the present embodiment. FIG. 21 is a sectional view of the knob along line 21-21 illustrated in FIG. 20. Operation knob 2020 is attached onto panel 15 of display device 100 illustrated in FIG. 2, similarly to operation knob 20 in accordance with the first embodiment. Separating unit 2096 is disposed between operation surface 2022A of dial type operation unit 2022 and operation surface 2088A of button type operation unit 2024 of operation knob 2020. Dial type operation unit 2022 and button type operation unit 2024 are made of conductive material while separating unit 2096 is made of non-conductive material. The same configurations as in the first embodiment will be denoted by the same reference signs and may not be described in detail.

Each of some operation knobs in accordance with the first and second embodiments includes a dial type operation unit for a rotating operation and a button type operation unit for a push operation. These two operation units improve the convenience of use of the operation knobs. However, when the operator performs a push operation to the button type operation unit of such operation knobs, a finger of the operator may contact a dial. In this case, the dial type operation unit is rotationally operated erroneously. In order to avoid this problem, the accuracy of operations is desired to improve for one operation knob that can perform plural operations. Therefore, separating unit 2096 is disposed in operation knob 2020. The basic configuration of operation knob 2020 is the same as operation knob 1020 described in the second embodiment with reference to FIG. 14.

That is, operation knob 2020 includes dial type operation unit 2022, button type operation unit 2024, rotation transmitting unit 2026, connecting unit 2028, rotating unit 2030, push transmitting unit 2032, housing 2034, and separating unit 2096. Button type operation unit 2024 includes upper portion 2088 and protruding portion 2090. Housing 2034 includes base portion 2036 and supporting unit 2040.

Dial type operation unit 2022, button type operation unit 2024, rotation transmitting unit 2026, connecting unit 2028, rotating unit 2030, push transmitting unit 2032, and housing 2034 correspond to dial type operation unit 1022, button type operation unit 1024, rotation transmitting unit 1026, connecting unit 1028, rotating unit 1030, push transmitting unit 1032, and housing 1034 of operation knob 1020, respectively. Upper portion 2088, operation surface 2088A, protruding portion 2090, base portion 2036, attachment surface 2038, and supporting unit 2040 correspond to upper portion 1088, operation surface 1088A, protruding portion 1090, base portion 1036, attachment surface 1038, and supporting unit 1040 of operation knob 1020, respectively.

Panel 15 illustrated in FIG. 21 has the same configuration as panel 15 illustrated in FIG. 14. That is, a part of base portion 2036 to which attachment surface 2038 is attached is recessed in the downward direction with respect to other parts of base portion 2036, and can accommodate base portion 2036. Water blocking wall 2098 having a ring shape stands around this part. Panel 15 and surface 16 may have a flat shape that does not have unevenness. Water blocking wall 2098 corresponds to water blocking wall 1098 of operation knob 1020. The same configurations as in operation knob 1020 described above have the same configurations and effects and thus will not be described in detail.

Separating unit 2096 has a stepped tubular shape that protrudes downward, and is surrounded by rotating unit 2030. Separating unit 2096 surrounds button type operation unit 2024. As described above, since dial type operation unit 2022 is disposed outside of rotating unit 2030, separating unit 2096 is disposed between dial type operation unit 2022 and button type operation unit 2024. As described above, separating unit 2096 is supported movably in the upward and downward directions by the inner surface of supporting unit 2040 of housing 2034. Upper portion 2088 has a circular plate shape and is surrounded by the circular annular part of separating unit 2096. Protruding portion 2090 protrudes downward from the center of the lower surface of upper portion 2088. Protruding portion 2090 has a circular columnar shape having a diameter smaller than the diameter of upper portion 2088. Upper portion 2088 and protruding portion 2090 may be integrated or may be formed individually. Upper portion 2088 and protruding portion 2090 are connected to the inner surface of separating unit 2096. When the operator pushes upper portion 2088 in such a configuration, button type operation unit 2024 and separating unit 2096 are pushed in a direction substantially perpendicular to surface 16 of panel 15.

As described above, the finger of the operator may contact both operation surfaces 2088A and 2022A in that case where operation surface 2088A of dial type operation unit 2022 to contact the operator is adjacent to operation surface 2022A of button type operation unit 2024 to contact with the operator. In order to avoid the above, rotating unit 2030 and separating unit 2096 that are made of non-conductive material are disposed between operation surface 2088A and operation surface 2022A of operation knob 2020. Rotating unit 2030 and separating unit 2096 electrically separate dial type operation unit 2022 from button type operation unit 2024. Rotating unit 2030 functions as a first separating unit that is connected to dial type operation unit 2022 while separating unit 2096 functions as a second separating unit that is connected to button type operation unit 2024.

As described above, operation knob 2020 includes, as an operation unit, dial type operation unit 2022 made of conductive material, and includes button type operation unit 2024 that is made of conductive material and that is arranged with dial type operation unit 2022. One of dial type operation unit 2022 and button type operation unit 2024 is a first operation unit, and the other thereof is a second operation unit. Operation knob 2020 includes, as a transmitting unit, rotation transmitting unit 2026 and push transmitting unit 2032. One of rotation transmitting unit 2026 and push transmitting unit 2032 is a first transmitting unit, and the other thereof is a second transmitting unit. Rotation transmitting unit 2026 transmits, to panel 15, an operation performed to dial type operation unit 2022 at a position distant from surface 16 of panel 15. Push transmitting unit 2032, to panel 15, transmits an operation performed to button type operation unit 2024 at a position distant from surface 16 of panel 15. Separating unit 2096 is disposed between operation surface 2022A of dial type operation unit 2022 and operation surface 2088A of button type operation unit 2024. Dial type operation unit 2022 and button type operation unit 2024 are made of conductive material while rotating unit 2030 and separating unit 2096 are made of non-conductive material.

The configuration of display device 100 is the same as the content described in accordance with the first embodiment with reference to FIG. 6 and thus will not be described.

Figure 22:
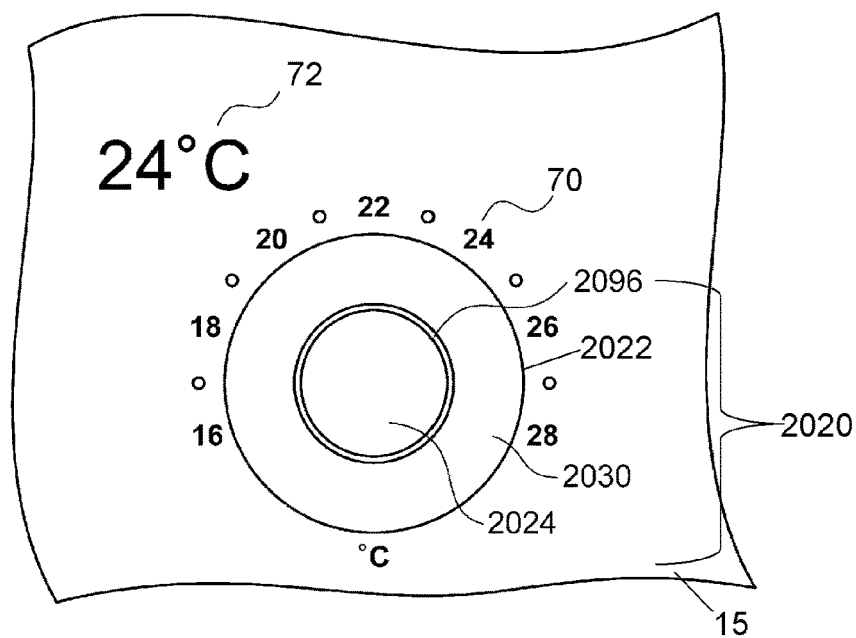
FIG. 22 illustrates a screen displayed in the case where the operation knob illustrated in FIG. 20 is mounted on the touch functional display panel shown in FIG. 2.

FIG. 22 illustrates a screen displayed on panel 15. This screen illustrates a case of performing a function of the temperature adjusting interface in control unit 52. Temperature setting using temperature scale 70, temperature-setting indicator 72, and operation knob 2020 and the system of turning on and off of the air conditioner are the same as described in the first embodiment with reference to FIG. 7 and thus will not be described.

Figure 23:
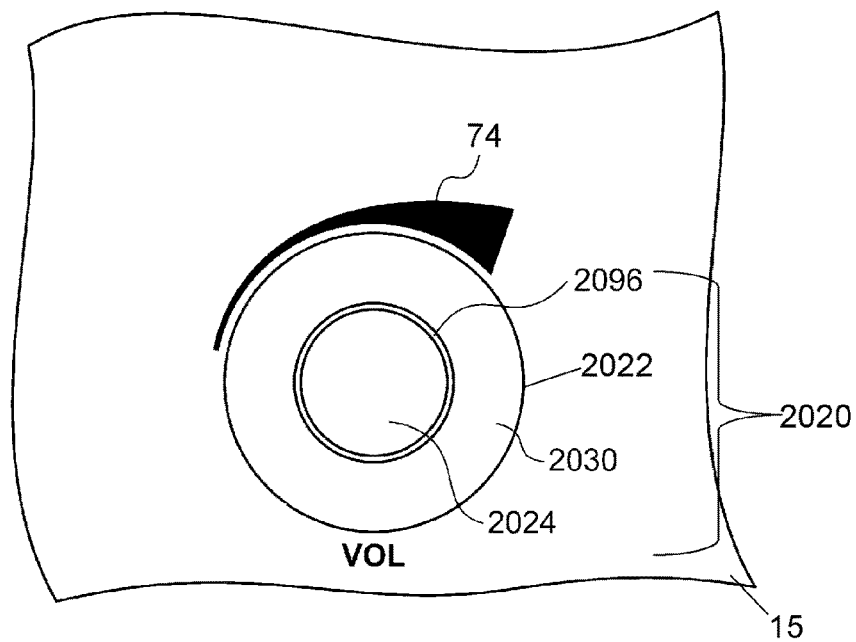
FIG. 23 illustrates another screen displayed in the case where the operation knob illustrated in FIG. 20 is mounted on the touch functional display panel shown in FIG. 2.

FIG. 23 illustrates another screen displayed on panel 15. This screen illustrates a case of performing the car audio function or the car navigation function in control unit 52. Volume level setting using volume level display 74 and operation knob 2020 and the system of turning on and off of loudspeaker 56 are the same as described in the first exemplary embodiment with reference to FIG. 8 and thus will not be described.

As described above, operation knob 2020 provides the same effect as operation knob 20. In addition, since rotating unit 2030 and separating unit 2096 are disposed between operation surface 2022A of dial type operation unit 2022 and operation surface 2088A of button type operation unit 2024, the finger of the operator is prevented from contacting both of operation surface 2088A and operation surface 2022A. Thus, an erroneous operation can be prevented. Consequently, the accuracy of operations performed to one operation knob that can perform plural operations can be improved.

Figure 24:
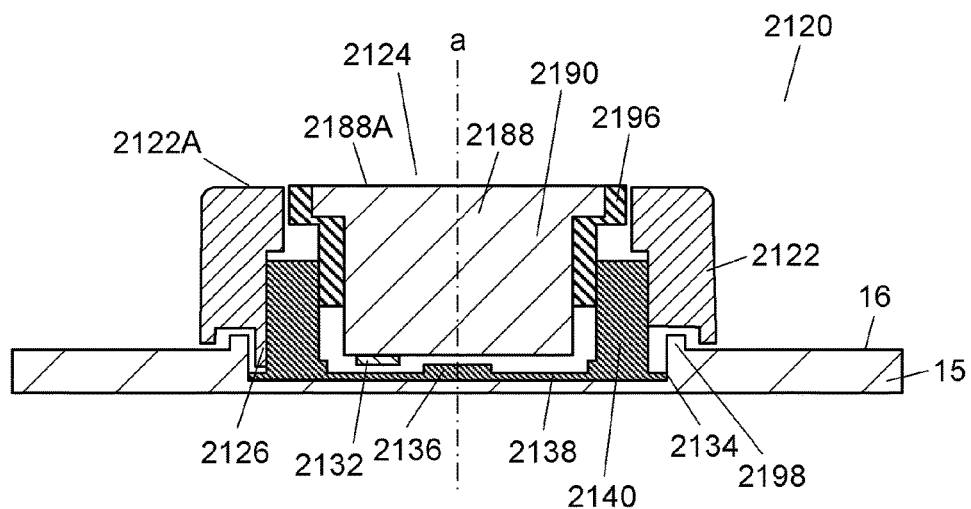
FIG. 24 is a sectional view of another operation knob according to the third exemplary embodiment of the present invention.

Operation knob 2120 will be described with reference to FIG. 24 below. FIG. 24 is a sectional view of operation knob 2120 according to the present embodiment. Operation knob 2120 is attached onto panel 15 in display device 100 illustrated in FIG. 2, similarly to operation knob 2020. Operation knob 2120 includes a different configuration for separating an operation surface of a dial type operation unit from an operation surface of a button type operation unit compared with operation knob 2020. Differences from operation knob 2020 will be mainly described below.

Operation knob 2120 includes dial type operation unit 2122, rotation transmitting unit 2126, button type operation unit 2124, push transmitting unit 2132, separating unit 2196, and housing 2134. Button type operation unit 2124 includes upper portion 2188 and protruding portion 2190. Housing 2134 includes base portion 2136 and supporting unit 2140.

Button type operation unit 2124, push transmitting unit 2132, separating unit 2196, and housing 2134 correspond to button type operation unit 2024, push transmitting unit 2032, separating unit 2096, and housing 2034 of operation knob 2020, respectively. Upper portion 2188, operation surfaces 2188A and 2122A, protruding portion 2190, base portion 2136, supporting unit 2140, attachment surface 2138, and water blocking wall 2198 correspond to upper portion 2088, operation surfaces 2088A and 2022A, protruding portion 2090, base portion 2036, supporting unit 2040, attachment surface 2038, and water blocking wall 2098 of operation knob 2020, respectively.

Operation knob 2120 does not include rotating unit 2030. Dial type operation unit 2122 is disposed in the part for rotating unit 2030. Furthermore, operation knob 2120 does not include connecting unit 2028. Dial type operation unit 2122 is directly connected to rotation transmitting unit 2126. This configuration allows only separating unit 2196 connected with button type operation unit 2124 to be disposed between operation surface 2188A and operation surface 2122A, and separates both operation surfaces from each other.

Operation knob 2120 does not include a rotating unit and includes separating unit 2196, thus having a simple configuration. In addition, with the configuration simplified, separating unit 2196 prevents the finger of the operator from contacting both of operation surface 2188A and operation surface 2122A.

Figure 25:
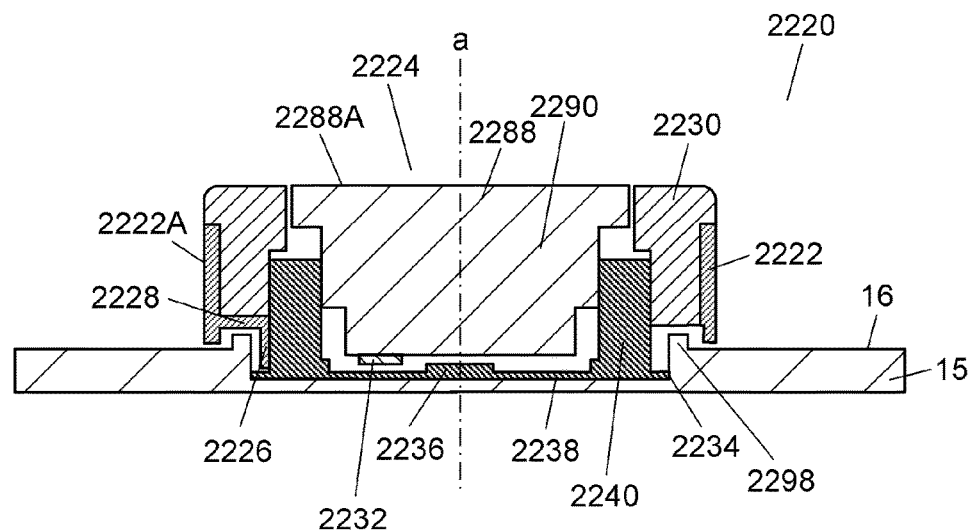
FIG. 25 is a sectional view of still another operation knob according to the third exemplary embodiment of the present invention.

Operation knob 2220 will be described with reference to FIG. 25 below. FIG. 25 is a sectional view of operation knob 2220 according to the present embodiment. Operation knob 2220 is attached onto panel 15 in display device 100 illustrated in FIG. 2, similarly to operation knob 2020.

Operation knob 2220 includes dial type operation unit 2222, rotating unit 2230, rotation transmitting unit 2226, connecting unit 2228, button type operation unit 2224, push transmitting unit 2232, and housing 2234. Button type operation unit 2224 includes upper portion 2288 and protruding portion 2290. Housing 2234 includes base portion 2236 and supporting unit 2240.

Dial type operation unit 2222, rotating unit 2230, rotation transmitting unit 2226, connecting unit 2228, button type operation unit 2224, push transmitting unit 2232, and housing 2234 correspond to dial type operation unit 2022, rotating unit 2030, rotation transmitting unit 2026, connecting unit 2028, button type operation unit 2024, push transmitting unit 2032, and housing 2034 of operation knob 2020, respectively. Upper portion 2288, operation surfaces 2288A and 2222A, protruding portion 2290, base portion 2236, attachment surface 2238, supporting unit 2240, and water blocking wall 2298 correspond to upper portion 2088, operation surfaces 2088A and 2022A, protruding portion 2090, base portion 2036, attachment surface 2038, supporting unit 2040, and water blocking wall 2098 of operation knob 2020, respectively.

Operation knob 2220 does not include separating unit 2096, and button type operation unit 2224 is disposed in the part for separating unit 2096. In this configuration, only rotating unit 2230 connected to dial type operation unit 2222 is disposed between the operation surface of dial type operation unit 2222 and the operation surface of button type operation unit 2224 while both operation surfaces are separated from each other. That is, rotating unit 2230 functions as a separating unit. Operation knob 2220 does not thus include a separating unit connected to button type operation unit 2224 and includes rotating unit 2230 as a separating unit, thus having a simple configuration.

Figure 26:
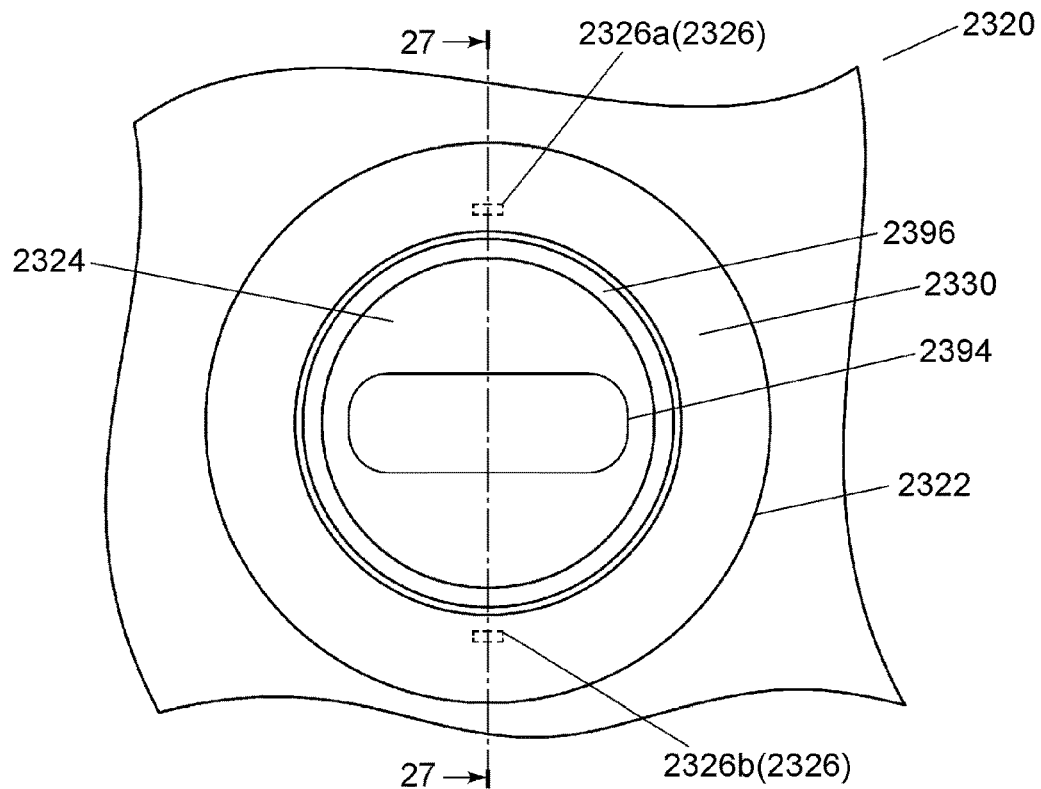
FIG. 26 is a front view of a further operation knob according to the third exemplary embodiment of the present invention.
Figure 27:
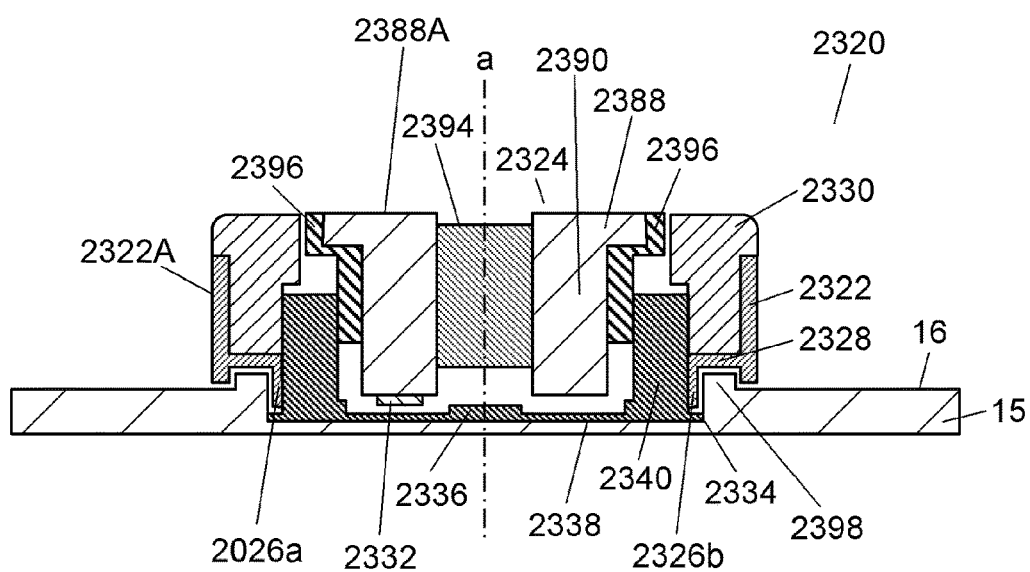
FIG. 27 is a sectional view of the operation knob illustrated in FIG. 26.

Operation knob 2320 will be described with reference to FIG. 26 and FIG. 27 below. FIG. 26 is a front view of operation knob 2320 according to the present embodiment. FIG. 27 is a sectional view of the knob along line 27-27 illustrated in FIG. 26. Operation knob 2320 is attached onto panel 15 of display device 100 illustrated in FIG. 2, similarly to operation knob 2020.

Operation knob 2320 includes dial type operation unit 2322, button type operation unit 2324, first rotation transmitting unit 2326a and second rotation transmitting unit 2326b that are collectively referred to as rotation transmitting unit 2326, connecting unit 2328, rotating unit 2330, push transmitting unit 2332, light guiding unit 2394, housing 2334, and separating unit 2396. Button type operation unit 2324 includes upper portion 2388 and protruding portion 2390. Housing 2334 includes base portion 2336 and supporting unit 2340.

Dial type operation unit 2322, rotating unit 2330, push transmitting unit 2332, housing 2334, and separating unit 2396 correspond to dial type operation unit 2022, rotating unit 2030, push transmitting unit 2032, housing 2034, and separating unit 2096 of operation knob 2020, respectively. Upper portion 2388, operation surfaces 2388A and 2322A, protruding portion 2390, base portion 2336, attachment surface 2338, supporting unit 2340, and water blocking wall 2398 correspond to upper portion 2088, operation surfaces 2088A and 2022A, protruding portion 2090, base portion 2036, attachment surface 2038, supporting unit 2040, and water blocking wall 2098 of operation knob 2020, respectively. The configuration, the effect, and a modification example of rotation transmitting unit 2326 are the same as those of rotation transmitting unit 1026 according to the second embodiment.

Light guiding unit 2394 is disposed in the center of button type operation unit 2324. Light guiding unit 2394 corresponds to light guiding unit 1094 of operation knob 1020 according to the second embodiment. The configuration, the effect, and a variation of light guiding unit 2394 are the same as those of light guiding unit 1094. Therefore, operation knob 2320 provides the same effect as operation knob 1020.

Each operation knob according to the present embodiment includes a dial type operation unit as a first operation unit and a button type operation unit as a second operation unit that is arranged with the dial type operation unit. However, plural button type operation units may be arranged, and a separating unit may be provided between any two of the button type operation units. In addition, plural dial type operation units may be disposed concentrically, and a separating unit may be formed between any two of the dial type operation units.

Fourth Exemplary Embodiment

Figure 28:
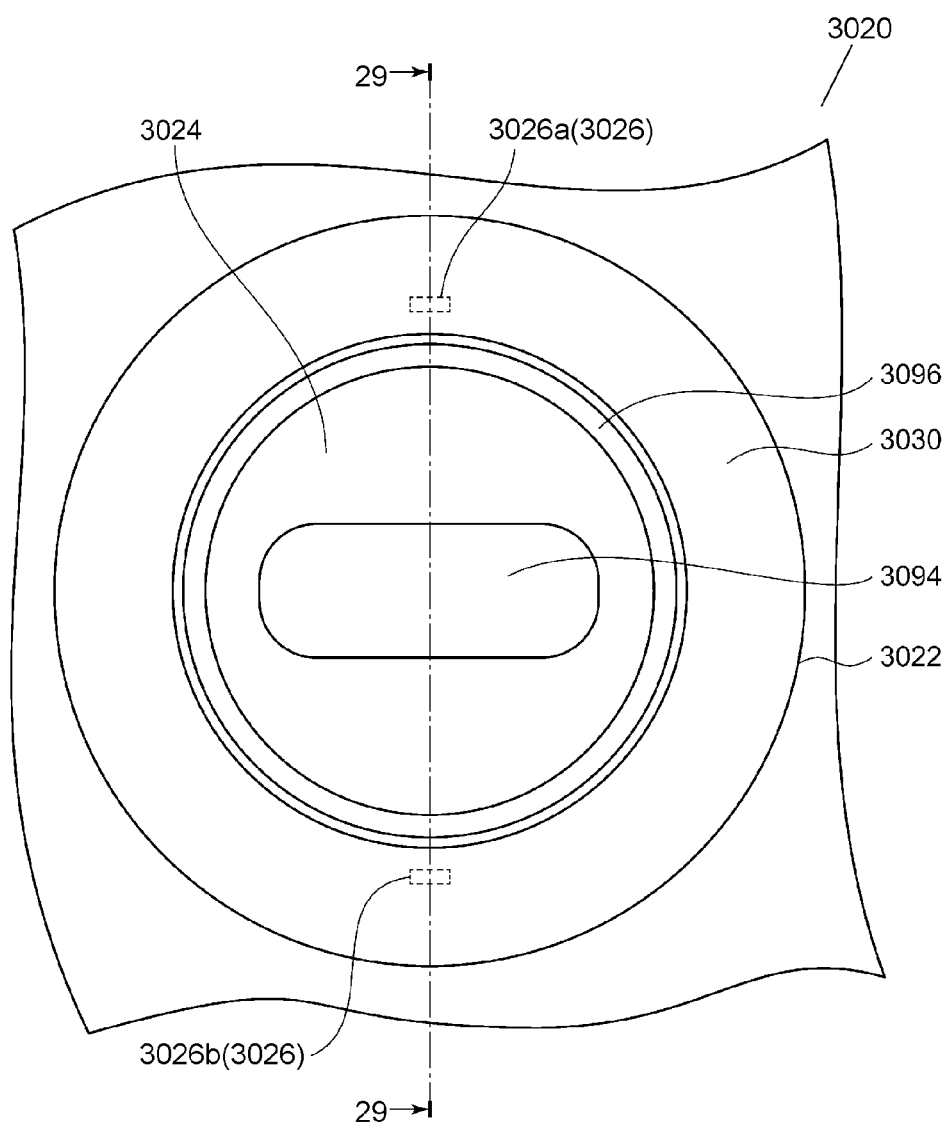
FIG. 28 is a front view of an operation knob according to a fourth exemplary embodiment of the present invention.
Figure 29:
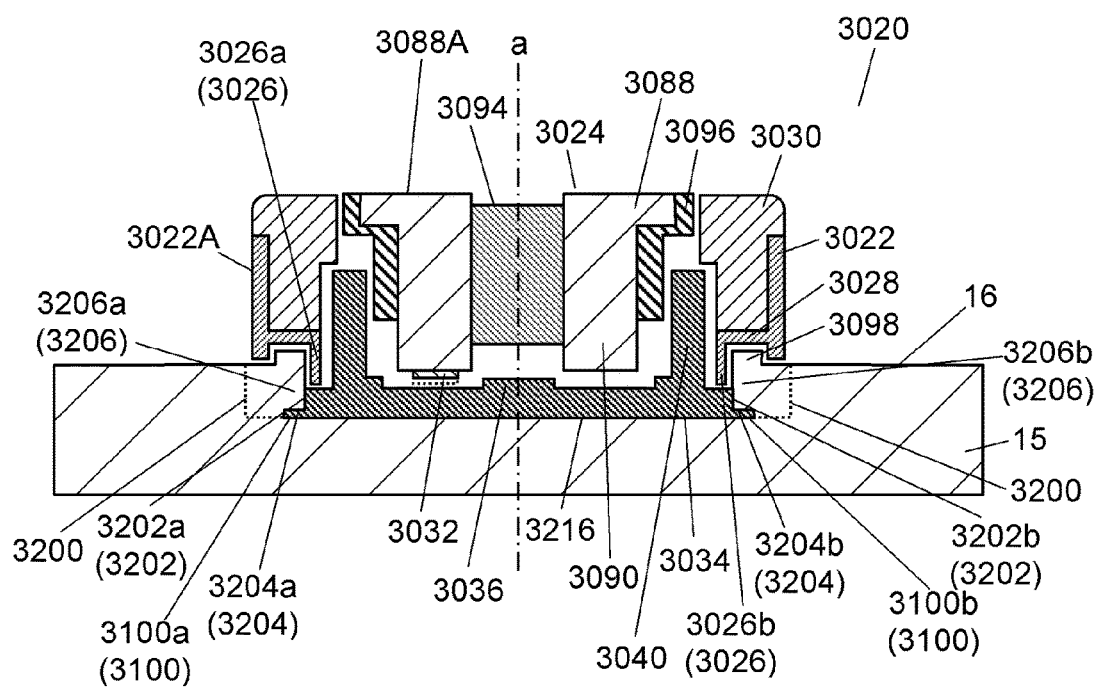
FIG. 29 is a sectional view of the operation knob illustrated in FIG. 28.

Operation knob 3020 according to a fourth exemplary embodiment will be described with reference to FIG. 28 and FIG. 29 below. FIG. 28 is a front view of operation knob 3020 according to the present embodiment. FIG. 29 is a sectional view of the knob along line 29-29 illustrated in FIG. 28. Operation knob 3020 is attached onto panel 15 of display device 100 illustrated in FIG. 2, similarly to operation knob 20 according to the first embodiment. Operation knob 3020 includes interlocked portion 3100 that protrudes from the outer surface of housing 3034 and is interlocked with panel 15. The same configurations as in the first embodiment are denoted by the same reference signs and may not be described in detail.

Firm attachment is required in order to prevent an operation knob attached to panel 15 from removing from panel 15. In addition, considering maintenance, inspection, repair, and exchange of the operation knob, the operation knob is preferably detachable from panel 15. Therefore, operation knob 3020 includes interlocked portion 3100 interlocked with panel 15.

Operation knob 3020 includes dial type operation unit 3022, button type operation unit 3024, first rotation transmitting unit 3026a and second rotation transmitting unit 3026b that are collectively referred to as rotation transmitting unit 3026, connecting unit 3028, rotating unit 3030, push transmitting unit 3032, light guiding unit 3094, separating unit 3096, and housing 3034. Button type operation unit 3024 includes upper portion 3088 and protruding portion 3090. Housing 3034 includes base portion 3036, supporting unit 3040, and first interlocked portion 3100a and second interlocked portion 3100b that are collectively referred to as interlocked portion 3100.

Dial type operation unit 3022, rotating unit 3030, push transmitting unit 3032, housing 3034, and separating unit 3096 correspond to dial type operation unit 2322, rotating unit 2330, push transmitting unit 2332, housing 2334, and separating unit 2396 of operation knob 2320 of the third embodiment, respectively. Upper portion 3088, operation surfaces 3088A and 3022A, protruding portion 3090, base portion 3036, supporting unit 3040, and water blocking wall 3098 correspond to upper portion 2388, operation surfaces 2388A and 2322A, protruding portion 2390, base portion 2336, supporting unit 2340, and water blocking wall 2398 of operation knob 2320, respectively. The configuration, the effect, and a modification example of rotation transmitting unit 3026 are the same as those of rotation transmitting unit 1026 according to the second embodiment.

Figure 30:
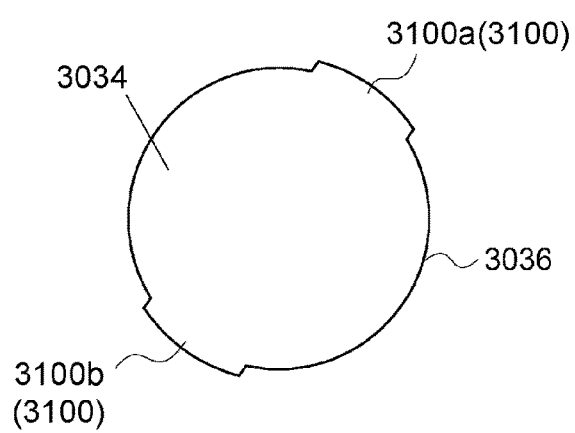
FIG. 30 is a front view of a base portion illustrated in FIG. 29.

First interlocked portion 3100a and second interlocked portion 3100b protrude from the lower part of the outer surface of base portion 3036 to the outside of base portion 3036. First interlocked portion 3100a and second interlocked portion 3100b constitutes interlocked portion 3100. FIG. 30 is a front view of base portion 3036 and interlocked portion 3100 of housing 3034. Base portion 3036 has a circular shape when viewed from the front. First interlocked portion 3100a and second interlocked portion 3100b are projections that extend from the outer surface of base portion 3036 outward in a radial direction of base portion 3036, and are disposed at positions symmetrical to each other by 180 degrees with respect to the center of base portion 3036 as the axis. First interlocked portion 3100a and second interlocked portion 3100b are interlocked with attachment unit 3200 that is disposed in panel 15.

Attachment unit 3200 is disposed in panel 15. Attachment unit 3200 includes first interlocking unit 3202a and second interlocking unit 3202b which constitute interlocking unit 3202, first interlocking groove 3204a and second interlocking groove 3204b which constitute interlocking groove 3204, first interlocking wall 3206a and second interlocking wall 3206b which constitute interlocking wall 3206, and bottom surface 3216. Interlocked portion 3100 is interlocked with interlocking unit 3202.

Figure 31:
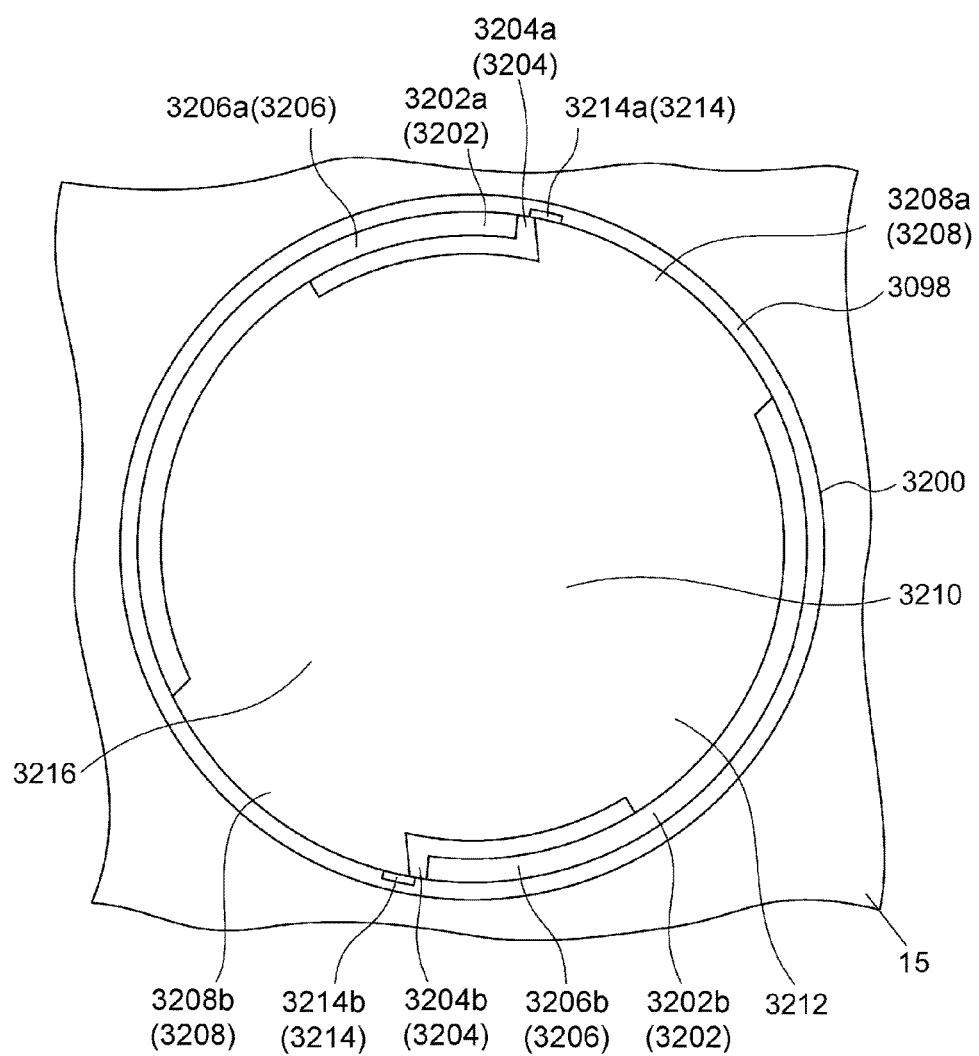
FIG. 31 is a front view of a touch functional display panel illustrated in FIG. 29.
Figure 32:
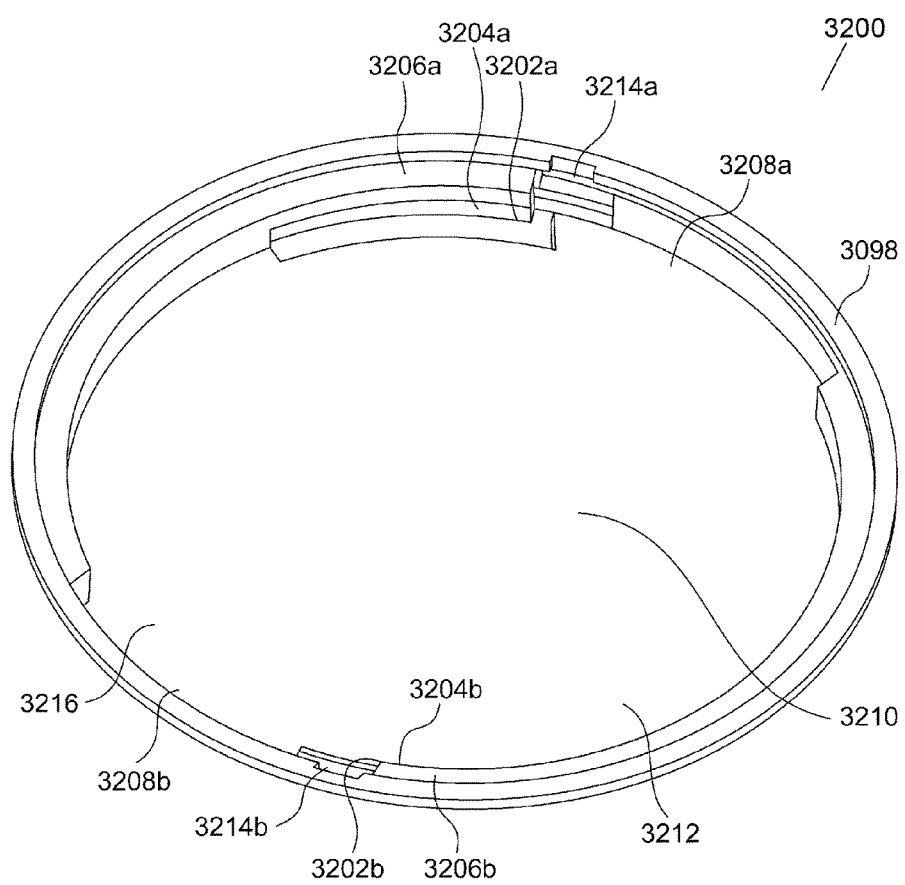
FIG. 32 is a perspective view of an attachment unit illustrated in FIG. 31.

A configuration of attachment unit 3200 disposed in panel 15 will be mainly described below. Attachment unit 3200 is disposed in panel 15 and interlocks operation knob 3020. While attachment unit 3200 is integrated with panel 15 as a part of a glass substrate or a cover lens constituting the outermost surface of panel 15, attachment unit 3200 is not limited thereto. For example, attachment unit 3200 may be fixed into a recess provided in panel 15. FIG. 31 and FIG. 32 will be referenced in addition to FIG. 29 in order to describe the configuration of attachment unit 3200. FIG. 31 is a front view of panel 15. FIG. 32 is a perspective view of attachment unit 3200. Operation knob 3020 is not attached in FIG. 31 and FIG. 32.

Water blocking wall 3098 having a ring shape stands on surface 16 of panel 15. The inner surface of water blocking wall 3098 extends downward and to bottom surface 3216 to form a recess having substantially s circular tubular shape. First interlocking wall 3206a and second interlocking wall 3206b have arcuate shapes concentric with water blocking wall 3098 and protrude inward from the inner surface of the recess. First interlocking wall 3206a and second interlocking wall 3206b are disposed at positions symmetrical to each other with respect to the center of the circular shape formed in the inner side of water blocking wall 3098. First interlocking wall 3206a and second interlocking wall 3206b constitute interlocking wall 3206. Interlocking wall 3206 and water blocking wall 3098 form an opening edge. An opening formed by the opening edge includes first interlocked portion opening 3208a, second interlocked portion opening 3208b, and base portion opening 3210. First interlocked portion opening 3208a and second interlocked portion opening 3208b constitute interlocked portion opening 3208.

Interlocked portion opening 3208 is a space provided between the side portion of first interlocking wall 3206a and the side portion of second interlocking wall 3206b which face each other. Interlocked portion opening 3208 is an opening having interlocked portion 3100 of operation knob 3020 to be inserted thereto. Interlocked portion opening 3208 has a length in the radial direction greater than or equal to the distance from the outer surface of base portion 3036 to the tip end of interlocked portion 3100. Interlocked portion opening 3208 has a circumferential length greater than or equal to the distance of interlocked portion 3100 in the circumferential direction. Base portion opening 3210 is an opening having base portion 3036 of operation knob 3020 inserted thereto and has a circular shape larger than the bottom surface of base portion 3036.

First interlocking groove 3204a is disposed below first interlocking wall 3206a while second interlocking groove 3204b is disposed below second interlocking wall 3206b. First interlocking groove 3204a and second interlocking groove 3204b constitute interlocking groove 3204. Interlocking groove 3204 has a shape that can interlock interlocked portion 3100 of operation knob 3020. A space surrounded by water blocking wall 3098, interlocking groove 3204, interlocking wall 3206, and bottom surface 3216, that is, a space surrounded by the above recesses is accommodation space 3212. Accommodation space 3212 has a shape that is recessed in the downward direction with respect to other parts of surface 16 of panel 15 and that can accommodate base portion 3036 having the circular plate shape and interlocked portion 3100 protruding from base portion 3036.

First lock unit 3214a is disposed on the inner surface constituting accommodation space 3212 at a part close to first interlocking groove 3204a. Second lock unit 3214b is disposed on the inner surface forming accommodation space 3212 at a part close to second interlocking groove 3204b. First lock unit 3214a and second lock unit 3214b constitute lock unit 3214. Lock unit 3214 elastically contacts interlocking unit 3202, and prevents interlocked portion 3100 from being detached from interlocking unit 3202 when interlocked portion 3100 is interlocked with interlocking unit 3202.

Water blocking wall 3098 constitutes the opening edge portion as described above. Furthermore, water blocking wall 3098 blocks water flowing from the outside to the inside of operation knob 3020 along surface 16 of panel 15. Panel 15 has a shape that is recessed in bottom surface 3216 and protrudes at water blocking wall 3098.

Figure 33A:
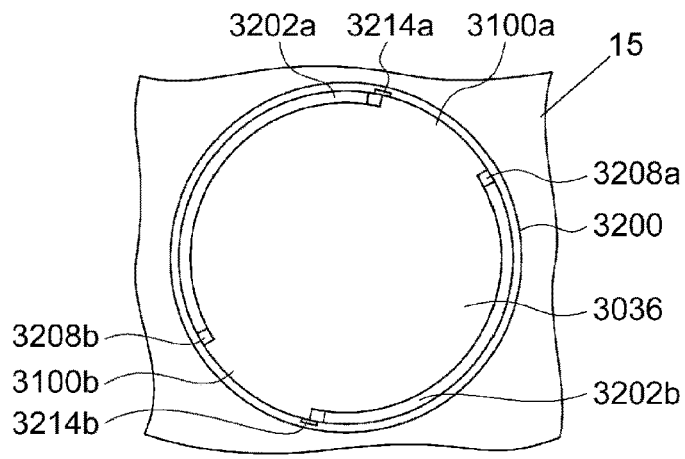
FIG. 33A illustrates a procedure of attaching the operation knob to the touch functional display panel illustrated in FIG. 31.
Figure 33B:
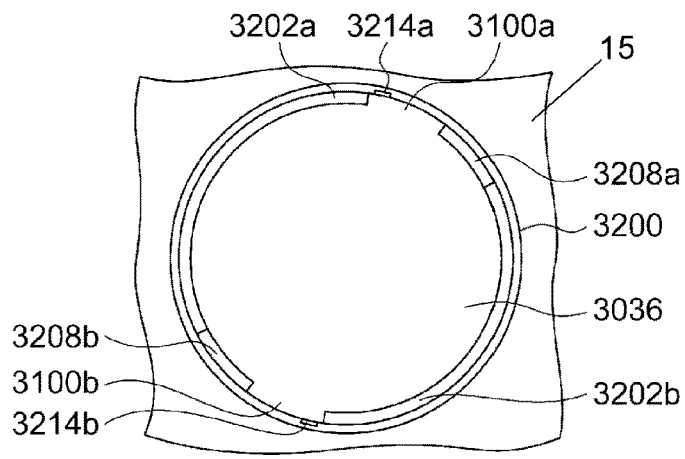
FIG. 33B illustrates a procedure continued from the process shown in FIG. 33A.
Figure 33C:
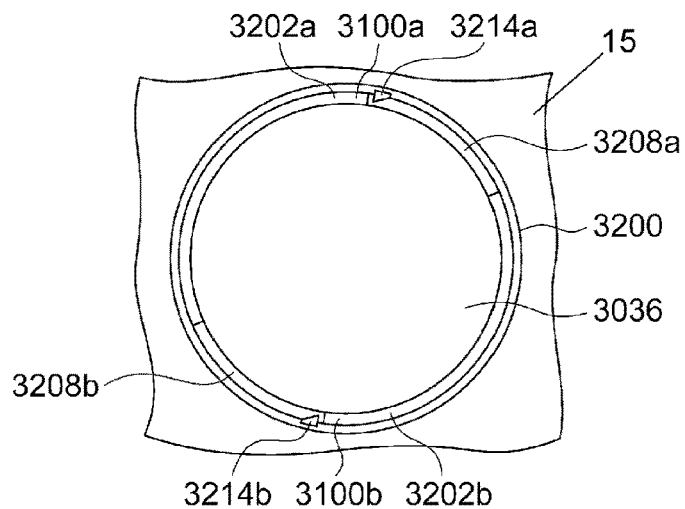
FIG. 33C illustrates a procedure continued from the process shown in FIG. 33B.

Processes for attaching operation knob 3020 to attachment unit 3200 will be described. FIGS. 33A to 33C illustrate the processes for attaching operation knob 3020 to panel 15. These drawings illustrate only base portion 3036 and interlocked portion 3100 of operation knob 3020, similarly to FIG. 30.

FIG. 33A is a front view of the portions in that case where first interlocked portion 3100a is inserted into first interlocked portion opening 3208a, second interlocked portion 3100b is inserted into second interlocked portion opening 3208b, and base portion 3036 is inserted into base portion opening 3210. Base portion 3036 and interlocked portion 3100 are disposed in accommodation space 3212 illustrated in FIG. 31 and FIG. 32. First interlocked portion 3100a causes first lock unit 3214a to incline toward the inner surface thereof while second interlocked portion 3100b causes second lock unit 3214b to incline toward the inner surface thereof.

In the process shown in FIG. 33B continuing from the process shown in FIG. 33A, base portion 3036 and interlocked portion 3100 that are disposed in accommodation space 3212 are rotated in the leftward direction to allow interlocking unit 3202 to interlock a part of interlocked portion 3100. Lock unit 3214 inclines toward the inner surface thereof during a period from insertion of interlocked portion 3100 into interlocked portion opening 3208 until rotation of interlocked portion 3100 along the inner circumferential surface.

In the process shown in FIG. 33C continuing from the process shown in FIG. 33B, base portion 3036 and interlocked portion 3100 are further rotated, and interlocked portion 3100 is interlocked by interlocking unit 3202. Interlocked portion 3100 is fit into interlocking groove 3204 shown in FIG. 31 and FIG. 32, and interlocking wall 3206 prevents interlocked portion 3100 from moving in the upward direction. Interlocking unit 3202 including interlocking groove 3204 and interlocking wall 3206 interlocks interlocked portion 3100, thereby allowing operation knob 3020 to be attached to attachment unit 3200. In addition, lock unit 3214 extending from the inner surface prevents interlocked portion 3100 that is interlocked with interlocking unit 3202 from rotating in the rightward direction, and prevents interlocked portion 3100 from being detached from interlocking unit 3202. Interlocking unit 3202 is thus disposed at a position which deviates from a position at which first interlocked portion 3100a is inserted into first interlocked portion opening 3208a and which deviates from a position at which second interlocked portion 3100b is inserted into second interlocked portion opening 3208b.

As illustrated in FIG. 29, attachment unit 3200 is disposed inside of panel 15 and is made of non-conductive material having transmissivity. Thus, the display area of panel 15 is secured more than the case where a mechanism for attaching operation knob 3020 is disposed on surface 16. Panel 15 and attachment unit 3200 have transmissivity, and may allow an interlocked part between interlocking unit 3202 and interlocked portion 3100 to be visible from outside. The interlocked part is preferably not visible in view of the exterior of display device 100. Thus, interlocked portion 3100 of operation knob 3020 is preferably disposed on the inner side from the outer edges of rotating unit 3030 and dial type operation unit 3022 as illustrated in FIG. 29. This configuration allows the interlocked part to be hidden by rotating unit 3030 and dial type operation unit 3022.

The configuration of display device 100 is the same as the content described according to the first embodiment with reference to FIG. 6 and thus will not be described.

Figure 34:
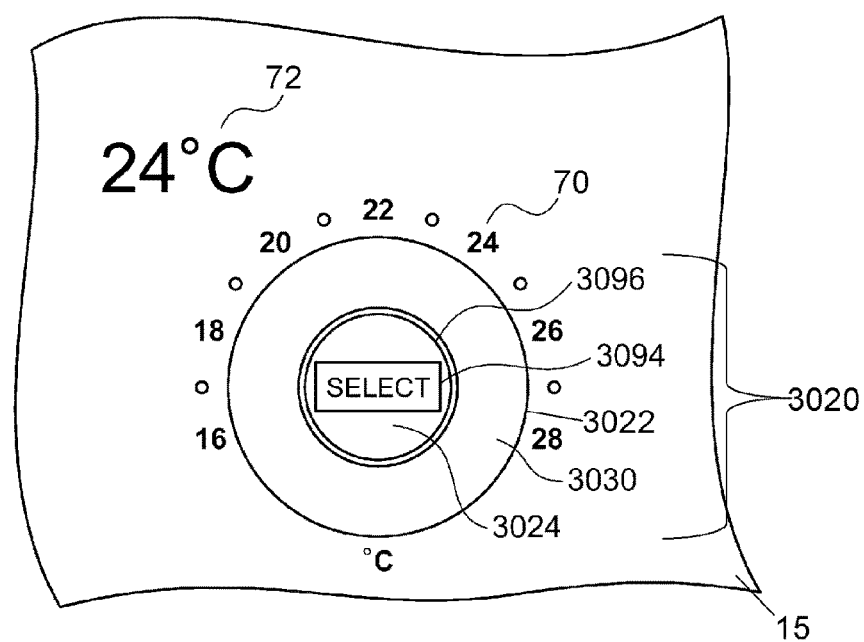
FIG. 34 illustrates a screen displayed in the case where the operation knob illustrated in FIG. 28 is mounted on the touch functional display panel shown in FIG. 2.

FIG. 34 illustrates a screen displayed on panel 15. This screen illustrates a case of performing the function of the temperature adjusting interface in control unit 52. Temperature setting using temperature scale 70, temperature-setting indicator 72, and operation knob 3020 and the system of turning on and off of the air conditioner are the same as described according to the first embodiment with reference to FIG. 7 and thus will not be described.

Figure 35:
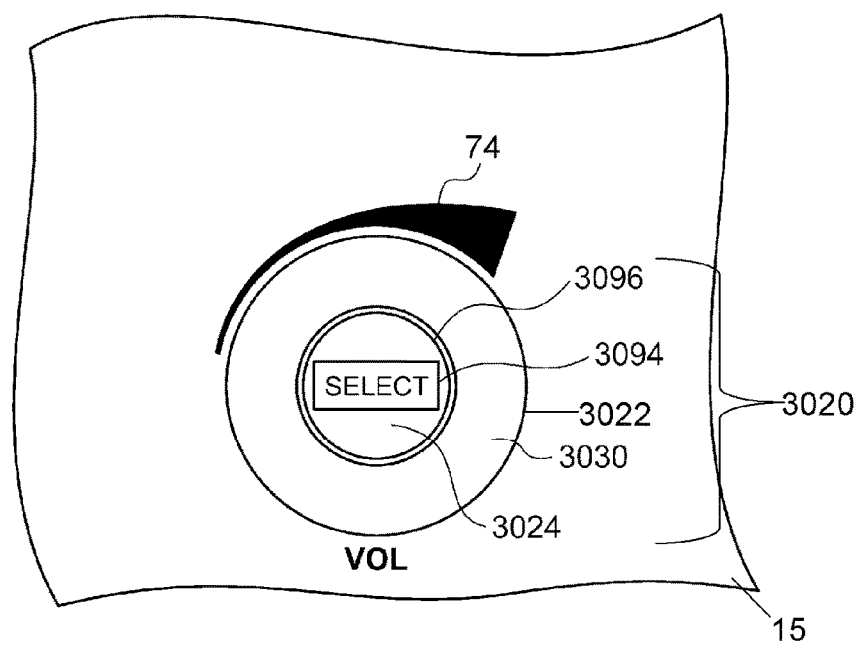
FIG. 35 illustrates another screen displayed in the case where the operation knob illustrated in FIG. 28 is mounted on the touch functional display panel shown in FIG. 2.

FIG. 35 illustrates another screen displayed on panel 15. This screen illustrates a case of performing the car audio function or the car navigation function in control unit 52. Volume level setting using volume level display 74 and operation knob 3020 and the system of turning on and off of loudspeaker 56 are the same as described according to the first embodiment with reference to FIG. 8 and thus will not be described.

As described above, operation knob 3020 provides the same effect as operation knob 2320. In addition, interlocked portion 3100 protruding from the outer surface of housing 3034 is interlocked with attachment unit 3200 disposed in panel 15, thereby allowing operation knob 3020 to be firmly attached to panel 15. In addition, attachment unit 3200 disposed inside of panel 15 provides panel 15 with a wide display area. Operation knob 3020 is detachably interlocked with panel 15, thereby allowing maintenance, inspection, repair, and exchange of operation knob 3020 to be easily performed. In addition, interlocked portion 3100 disposed on the inner side from the outer edge of dial type operation unit 3022 allows the interlocked part to be hidden from the outside, hence improving the exterior of the knob.

In addition, interlocked portion 3100 is inserted into attachment unit 3200 through an opening disposed in accommodation space 3212, and is moved in a predetermined direction as to be interlocked with interlocking unit 3202, thereby allowing operation knob 3020 to be firmly attached to panel 15. In addition, an opening, accommodation space 3212, and interlocking unit 3202 are disposed in panel 15. This configuration secures a wide display area of panel 15. In addition, lock unit 3214 locks interlocking in the case where interlocked portion 3100 is interlocked with interlocking unit 3202, thereby allowing operation knob 3020 to be firmly attached to panel 15. In addition, water blocking wall 3098 surrounding the opening prevents water from entering into operation knob 3020. Thus, Failures in operation knob 3020 can decrease.

A projection which is interlocked portion 3100 is interlocked with interlocking groove 3204 of interlocking unit 3202. However, interlocked portion 3100 is not limited thereto. The relationship between interlocked portion 3100 and interlocking unit 3202 may be inverted. That is, a groove may be formed in interlocked portion 3100 while a projection may be formed in interlocking unit 3202. Interlocked portion 3100 and interlocking unit 3202 may be designed arbitrarily.

Lock unit 3214 is disposed on the inner surface forming accommodation space 3212. However, lock unit 3214 is not limited thereto. Lock unit 3214 may be disposed on bottom surface 3216.

Light guiding unit 3094 is not essential and may not necessarily be disposed.

Figure 36:
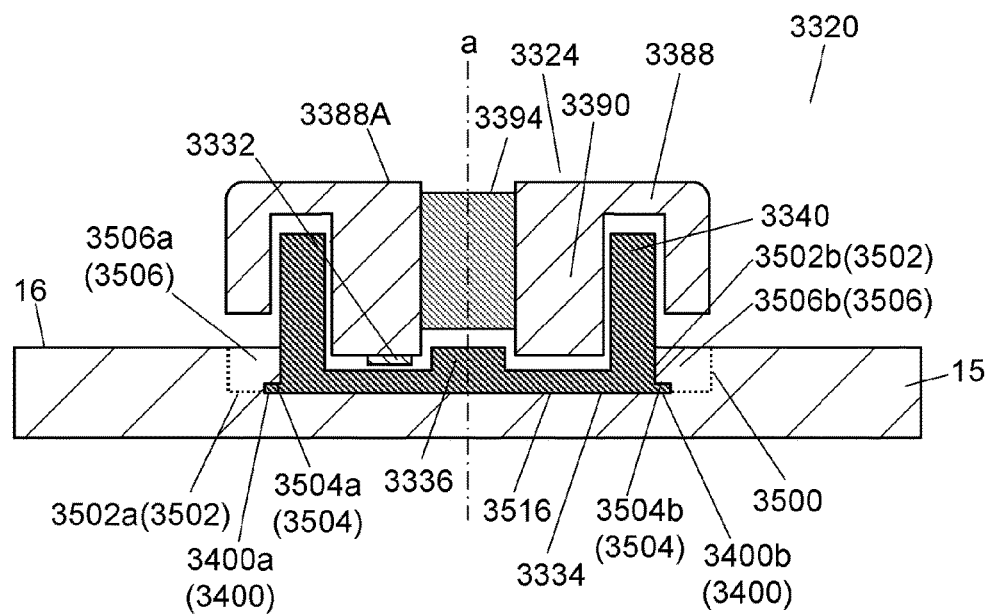
FIG. 36 is a sectional view of another operation knob according to the fourth exemplary embodiment of the present invention.

Operation knob 3320 will be described with reference to FIG. 36 below. FIG. 36 is a sectional view of operation knob 3320 according to the present embodiment. Operation knob 3320 is attached onto panel 15 of display device 100 illustrated in FIG. 2, similarly to operation knob 3020. While operation knob 3020 includes dial type operation unit 3022 and button type operation unit 3024, operation knob 3320 includes only button type operation unit 3324. Differences from operation knob 3020 will be mainly described below.

Operation knob 3320 includes button type operation unit 3324, push transmitting unit 3332, light guiding unit 3394, and housing 3334. Button type operation unit 3324 includes upper portion 3388 and protruding portion 3390. Housing 3334 includes base portion 3336, supporting unit 3340, and first interlocked portion 3400a and second interlocked portion 3400b that constitute interlocked portion 3400. Attachment unit 3500 is disposed in panel 15. Attachment unit 3500 includes first interlocking unit 3502a and second interlocking unit 3502b that constitute interlocking unit 3502, first interlocking groove 3504a and second interlocking groove 3504b that constitute interlocking groove 3504, first interlocking wall 3506a and second interlocking wall 3506b that constitute interlocking wall 3506, and bottom surface 3516.

Button type operation unit 3324, push transmitting unit 3332, light guiding unit 3394, and housing 3334 correspond to button type operation unit 3024, push transmitting unit 3032, light guiding unit 3094, and housing 3034 of operation knob 3020, respectively. Upper portion 3388, protruding portion 3390, base portion 3336, supporting unit 3340, and interlocked portion 3400 correspond to upper portion 3088, protruding portion 3090, base portion 3036, supporting unit 3040, and interlocked portion 3100 of operation knob 3020, respectively. Interlocking unit 3502, interlocking groove 3504, interlocking wall 3506, and bottom surface 3516 correspond to interlocking unit 3202, interlocking groove 3204, interlocking wall 3206, and bottom surface 3216 of operation knob 3020, respectively.

Operation knob 3320 does not include dial type operation unit 3022, rotation transmitting unit 3026, connecting unit 3028, and rotating unit 3030 illustrated in FIG. 29. Upper portion 3388 of button type operation unit 3324 constitutes the upper surface side operation part (operation surface 3388A) of button type operation unit 3324, similarly to operation knob 3020. Upper portion 3388 extends downward from the outside of supporting unit 3340. This portion constitutes the side surface side operation part of button type operation unit 3324.

Operation knob 3320 does not include a dial type operation unit and includes button type operation unit 3324, thus having a simple configuration. In addition, since the area of an exposed part of button type operation unit 3324 is increased, the operator can securely contact button type operation unit 3324.

Various embodiments of the present invention are described above. These embodiments are for illustrative purposes, and various modification examples can be configured by combinations of each constituent element or each process of the embodiments. In addition, it is to be understood by those skilled in the art that such modification examples fall within the scope of the present invention.

Display device 100 is configured as an on-board device. However, display device 100 is not limited thereto. For example, display device 100 is not limited to an on-board device and may be configured as a home electronic appliance or a business electronic appliance. In these cases, functions other than the car audio function, the car navigation function, and the function of the temperature adjusting interface may be performed. The extent to which the present invention is thus applied can be increased.

INDUSTRIAL APPLICABILITY

An operation knob according to the present invention can be applied for use in not only operating an on-board device through a touch panel but also operating a home electronic appliance or a business electronic appliance.

REFERENCE MARKS IN THE DRAWINGS 2 windshield
4 steering wheel
6 driver seat
8 passenger seat
10 case
12 main frame
15 touch functional display panel (panel)
16 surface
20, 120, 220, 320, 420, 1020, 1120, 1220, 1320, 2020, 2120, 2220, 2320, 3020, 3320 operation knob
22, 122, 322, 422, 1022, 2022, 2122, 2222, 2322, 3022 dial type operation unit
24, 224, 324, 1024, 1124, 1224, 1324, 2024, 2124, 2224, 2324, 3024, 3324 button type operation unit
26, 126, 326, 426, 1026, 2026, 2126, 2226, 2326, 3026 rotation transmitting unit
28, 128, 328, 428, 1028, 2028, 2228, 2328, 3028 connecting unit
30, 130, 330, 430, 1030, 2030, 2230, 2330, 3030 rotating unit
32, 232, 332, 1032, 1132, 1232, 1332, 2032, 2132, 2232, 2332, 3032, 3332 push transmitting unit
34, 134, 234, 334, 434, 1034, 1134, 1234, 1334, 2034, 2134, 2234, 2334, 3034, 3334 housing
36, 136, 236, 336, 436, 1036, 1136, 1236, 1336, 2036, 2136, 2236, 2336, 3036, 3336 base portion
38, 138, 238, 338, 438, 1038, 1138, 1238, 1338, 2038, 2138, 2238, 2338 attachment surface
40, 140, 340, 440 outer supporting unit
42, 242, 342 inner supporting unit
50 operation unit
52 control unit
54 audio processing unit
56 loudspeaker
58 display processing unit
60 storage unit
62 touch button
62a first touch button
62b second touch button
62c third touch button
62d fourth touch button
62n N-th touch button
64 touch detecting unit
66 display unit
70 temperature scale
72 temperature-setting indicator
74 volume level display
80, 88, 180, 288, 380, 388, 480, 1088, 1188, 1288, 2088, 2188, 2288, 2388, 3088, 3388 upper portion
82, 182, 382, 482 outer wall portion
84, 184, 384, 484 inner wall portion
90, 290, 390, 1090, 1190, 1290, 1390, 2090, 2190, 2290, 2390, 3090, 3390 protruding portion
100 display device
1026a, 2326a, 3026a first rotation transmitting unit
1026b, 2326b, 3026b second rotation transmitting unit
1040, 1140, 1240, 1340, 2040, 2140, 2240, 2340, 3040, 3340 supporting unit
1088A, 1188A, 1288A, 1324A, 2022A, 2088A, 2122A, 2188A, 2222A, 2288A, 2322A, 2388A, 3022A, 3088A, 3388A operation surface
1094, 1194, 1294, 1394, 2394, 3094, 3394 light guiding unit
1094A, 1294A first end portion
1098, 2098, 2198, 2298, 2398, 3098 water blocking wall
2096, 2196, 2396, 3096 separating unit
3100, 3400 interlocked portion
3100a, 3400a first interlocked portion
3100b, 3400b second interlocked portion
3200, 3500 attachment unit 3202, 3502 interlocking unit
3202a, 3502a first interlocking unit
3202b, 3502b second interlocking unit
3204, 3504 interlocking groove
3204a, 3504a first interlocking groove
3204b, 3504b second interlocking groove
3206, 3506 interlocking wall
3206a, 3506a first interlocking wall
3206b, 3506b second interlocking wall
3208 interlocked portion opening
3208a first interlocked portion opening
3208b second interlocked portion opening
3210 base portion opening
3212 accommodation space
3214 lock unit
3214a first lock unit
3214b second lock unit
3216, 3516 bottom surface

The invention claimed is:

1. An operation knob configured to be attached onto a touch functional display panel, the operation knob comprising:
   an operation unit; and
   a transmitting unit configured to transmit, to the touch functional display panel, an operation performed to the operation unit at a position distant from a surface of the touch functional display panel, wherein:
   the operation unit includes:
      a first operation unit made of conductive material; and
      a second operation unit arranged with the first operation unit and made of conductive material,
   the transmitting unit includes:
      a first transmitting unit that transmits, to the touch functional display panel, an operation performed to the first operation unit at a position distant from the surface of the touch functional display panel; and
      a second transmitting unit that transmits, to the touch functional display panel, an operation performed to the second operation unit at a position distant from the surface of the touch functional display panel, and
   the operation knob further comprises a separating unit disposed between an operation surface of the first operation unit and an operation surface of the second operation unit, the separating unit being made of non-conductive material.

2. The operation knob of claim 1, wherein the separating unit is connected to the first operation unit.

3. The operation knob of claim 1, wherein the separating unit is connected to the second operation unit.

4. The operation knob of claim 1, wherein the separating unit includes:
   a first separating unit connected to the first operation unit; and
   a second separating unit connected to the second operation unit.

5. The operation knob of claim 1, further comprising
   a housing supporting the first operation unit, the first transmitting unit, the second operation unit, the second transmitting unit, and the separating unit, the housing being configured to be attached to the touch functional display panel,
   wherein the first transmitting unit and the second transmitting unit face the surface of the touch functional display panel across the housing.

6. The operation knob of claim 1,
   wherein the first operation unit is a dial type operation unit rotatable about an axis perpendicular to the surface of the touch functional display panel,
   wherein the first transmitting unit is rotatable about the axis in conjunction with rotation of the first operation unit,
   wherein the second operation unit is a button type operation unit pushable in a direction perpendicular to the surface of the touch functional display panel, and
   wherein the second transmitting unit can approach the surface of the touch functional display panel in conjunction with pushing of the second operation unit.

7. A display device comprising:
   a touch functional display panel; and
   the operation knob of claim 1 attached to the touch functional display panel.

* * * * *